(12) United States Patent
Colbeck et al.

(10) Patent No.: US 8,102,164 B2
(45) Date of Patent: Jan. 24, 2012

(54) POWER FACTOR CORRECTION CONVERTER CONTROL OFFSET

(75) Inventors: Roger Colbeck, Ottawa (CA); Paul DeMone, Kanata (CA); Anthony Peter Ernest Reinberger, Nepean (CA)

(73) Assignee: Power Integrations, Inc., San Jose, CA (US)

( * ) Notice: Subject to any disclaimer, the term of this patent is extended or adjusted under 35 U.S.C. 154(b) by 695 days.

(21) Appl. No.: 12/142,525

(22) Filed: Jun. 19, 2008

(65) Prior Publication Data
US 2009/0316454 A1     Dec. 24, 2009

(51) Int. Cl.
*G05F 1/40*     (2006.01)
(52) U.S. Cl. ........................ 323/282; 323/271
(58) Field of Classification Search .......... 323/222–225, 323/268, 271, 282, 285, 299–303; 363/16, 363/17, 21.01, 21.02, 97, 98, 131, 132
See application file for complete search history.

(56) References Cited

U.S. PATENT DOCUMENTS

| | | | |
|---|---|---|---|
| 5,500,792 A | 3/1996 | Jeon et al. | |
| 5,510,974 A | 4/1996 | Gu et al. | |
| 5,565,761 A | 10/1996 | Hwang | |
| 5,598,326 A | 1/1997 | Liu et al. | |
| 5,629,841 A * | 5/1997 | Attwood | 363/21.16 |
| 5,642,065 A | 6/1997 | Choi et al. | |
| 5,757,166 A * | 5/1998 | Sodhi | 323/222 |
| 5,798,635 A | 8/1998 | Hwang et al. | |
| 6,181,079 B1 | 1/2001 | Chang et al. | |
| 6,215,288 B1 | 4/2001 | Ramsey et al. | |
| 6,249,876 B1 | 6/2001 | Balakrishnan et al. | |
| 6,272,025 B1 | 8/2001 | Riggio et al. | |
| 6,307,361 B1 | 10/2001 | Yaakov et al. | |
| 6,437,994 B1 | 8/2002 | Blom et al. | |
| 6,462,966 B1 | 10/2002 | Leung et al. | |
| 6,469,917 B1 | 10/2002 | Ben-Yaakov | |
| 6,728,121 B2 | 4/2004 | Ben-Yaakov et al. | |
| 6,903,536 B2 | 6/2005 | Yang | |
| 7,042,743 B2 | 5/2006 | Pidutti et al. | |
| 7,184,280 B2 | 2/2007 | Sun et al. | |
| 7,440,297 B2 | 10/2008 | Adragna et al. | |
| 7,821,801 B2 | 10/2010 | Janson et al. | |
| 7,848,117 B2 | 12/2010 | Reinberger et al. | |
| 7,885,085 B2 | 2/2011 | Orr et al. | |
| 7,911,812 B2 | 3/2011 | Colbeck et al. | |
| 2003/0223255 A1 | 12/2003 | Ben-Yaakov et al. | |
| 2007/0063684 A1 | 3/2007 | Adragna et al. | |

(Continued)

OTHER PUBLICATIONS

Ben-Yaakov et al., "The Dynamics of a PWM Boost Converter with Resistive Input," IEEE Transactions on Industrial Electronics, vol. 46, No. 3, Jun. 1999, pp. 613-619.

(Continued)

*Primary Examiner* — Matthew Nguyen
(74) *Attorney, Agent, or Firm* — Blakely Sokoloff Taylor & Zafman LLP

(57) ABSTRACT

Power factor correction converter control offset apparatus and methods are disclosed. In one aspect, an apparatus includes a control unit to generate a control signal to control a duty cycle of a PWM (Pulse Width Modulation) switching signal that controls a switch in a PFC (Power Factor Correction) converter. An offset unit is also included and is coupled to the control unit, to generate a variable offset signal to offset the control signal or a signal used by the control unit to generate the control signal.

31 Claims, 16 Drawing Sheets

U.S. PATENT DOCUMENTS

| | | |
|---|---|---|
| 2007/0242487 A1 | 10/2007 | Orr |
| 2008/0197817 A1 | 8/2008 | Colbeck et al. |
| 2008/0198638 A1 | 8/2008 | Reinberger et al. |
| 2009/0091957 A1 | 4/2009 | Orr et al. |
| 2011/0044074 A1 | 2/2011 | Reinberger et al. |
| 2011/0095734 A1 | 4/2011 | Orr et al. |
| 2011/0134670 A1 | 6/2011 | Colbeck et al. |

OTHER PUBLICATIONS

Yang, "LLC Resonant Converter," Chapter 4, *Topology Investigation for Front End DC/DC Power Conversion for Distributed Power System*, Dissertation submitted to the Faculty of Virginia Polytechnic Institute and State University, Sep. 12, 2003, pp. 94-141.

Adragna, "AN1792 Application Note: Design of Fixed-Off-Time-Controlled PFC Pre-Regulators with the L6562," STMicroelectronics, Nov. 2003, pp. 1-30.

ON Semiconductor, "Overview of Power Factor Correction Approaches," Power Factor Correction Handbook, Chapter 1, HBD853/D, Rev. 2, Aug. 2004, pp. 5-17.

Fairchild Semiconductor, "Application Note 42047: Power Factor Correction (PFC) Basics," Rev. 0.9.0, Aug. 19, 2004, pp. 1-11.

Fairchild Semiconductor, "FAN4803: 8-Pin PFC and PWM Controller Combo," Rev. 1.2.3, Nov. 2, 2004, p. 1.

STMicroelectronics, "L6599: High-Voltage Resonant Controller," Rev. 2, Jul. 2006, pp. 1-36.

STMicroelectronics, "AN2321 Application Note: Reference Design: High Performance, L6599-based HB-LLC Adapter with PFC for Laptop Computers," Rev. 1, Aug. 2006, pp. 1-29.

STMicroelectronics, "AN2393 Application Note: Reference Design: Wide Range 200W L6599-based HB-LLC Resonant Converter for LCD TV & Flat Panels," Rev. 2, Sep. 2006, pp. 1-37.

STMicroelectronics, "L6563—L6563A: Advanced Transition-Mode PFC Controller," Rev. 3, Nov. 2006, pp. 1-37.

PCT/CA2008/000108—PCT International Search Report and Written Opinion, mailed Apr. 15, 2008.

PCT/CA2008/000109—PCT International Search Report and Written Opinion, mailed May 7, 2008.

PCT/CA2008/000111—PCT International Search Report and Written Opinion, mailed May 1, 2008.

PCT/CA2008/000108—International Preliminary Report on Patentability and Written Opinion, dated Jul. 28, 2009.

PCT/CA2008/000109—International Preliminary Report on Patentability and Written Opinion, dated Jul. 28, 2009.

PCT/CA2008/000111—International Preliminary Report on Patentability and Written Opinion, dated Jul. 28, 2009.

\* cited by examiner

US 8,102,164 B2

POWER FACTOR CORRECTION CONVERTER CONTROL OFFSET

FIELD OF THE DISCLOSURE

The present invention relates generally to PFC (Power Factor Correction) power converters and, in particular, to offset apparatus and methods for PFC converter controllers.

BACKGROUND

PFC is often used in AC/DC conversion, in order to draw current sinusoidally in phase with a sinusoidal voltage. Ensuring adequate dynamic range of a PFC implementation, so that it can operate properly over a wide range of loads from light load to heavy load, can be an issue.

A particular architecture that can be used for PFC is one that does not use input voltage sensing and is sometimes called a "Doff controller", an "Indirect PFC Controller", or a "Single-Cycle PFC Controller" (although the latter example is a specific type of implementation that can be used with Doff/Indirect controllers). Doff is the portion or percentage of time that a boost switch in a power converter is off, i.e., it is 1-Don, where Don is the portion or percentage that a switching signal causes the switch to be on.

This type of PFC is based on the fundamental concept that Doff=Vin/Vout. Since Vout is a constant DC voltage and Vin is a sinusoidal input voltage in the case of AC/DC conversion, Doff must vary sinusoidally over the input voltage waveform. PWM (Pulse Width Modulation) can be used where a voltage across an input current sensing resistor is compared to a frequency ramp, for example. In order for Doff to vary sinusoidally, the current sensing voltage would also need to vary sinusoidally in phase with Vin, and reach a high enough value at its maximum so that the condition Doff=Vin(peak)/Vout is satisfied. This must also occur independently of the load, and independently of the level of input current that the PFC is sensing.

These conditions can require very high gains if the sensed input current is very small, i.e., under light load. The required gain will also be higher for high AC input voltages, such as 240V or 265V as opposed to 120V, since Doff must now reach a larger value, at the same time as the sensed input current is actually lower under the same power load. For an 85 Vrms (120V peak) input and 400 VDC output for instance, Doff must reach about 30%, whereas for a 265 Vrms (375V peak) input and 400V output, Doff must reach about 94%. In the latter case, the sensed input current would be only about 85/265=0.32 the current in the former case, thus requiring a much higher gain on the current sensing voltage to arrive at the required Doff.

Where an implementation has a finite maximum gain, there are some low values of input current where it may be impossible to multiply up enough to achieve the desired Doff value. This could be exacerbated at high input line voltages. Under this condition, the PFC might keep the boost switch on for a longer time than desired, increasing the current into the load and causing an over-voltage condition. This may result in a hysteretic behaviour or pulse-skipping, neither of which maintains the desired sinusoidal behaviour, impacting the Power Factor (PF) and Harmonic Distortion (HD) and possibly causing acoustic noise due to transformer mechanical noise. Another possible effect is stress on components such as capacitors. For example, if a converter goes out of regulation and into an over-voltage condition, higher voltages might be applied to hold-up capacitors, which also is not desirable.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

DETAILED DESCRIPTION

Methods and apparatuses for implementing control offset for PFC converters are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

Prior to considering the present invention in detail, illustrative examples of PFC converters in conjunction with which the teachings of the present invention may be implemented are described with reference to FIGS. 1 to 9. Further details may be found, for example, in U.S. patent application Ser. No. 12/016,950, entitled "CONTROL ARRANGEMENT FOR A PFC POWER CONVERTER", filed on Jan. 18, 2008, the entire contents of which are incorporated herein by reference.

Figure 1:
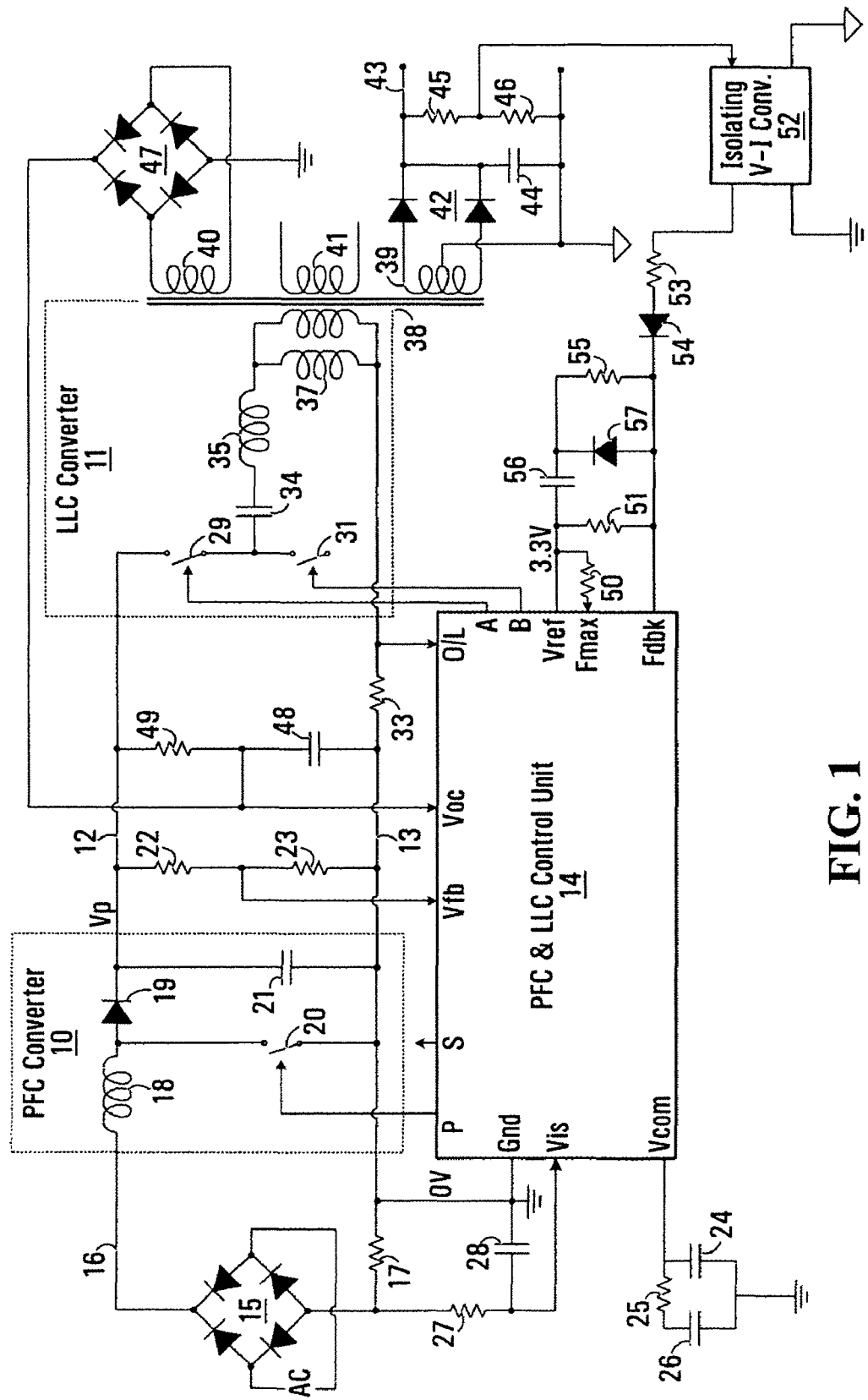
FIG. 1 schematically illustrates a power supply arrangement, including cascaded PFC and LLC power converters and a control arrangement for the converters.

A power supply arrangement as illustrated in FIG. 1 includes a PFC power converter 10 and an LLC power converter 11, the converters being shown within broken line boxes. The converters 10 and 11 are cascaded, a positive output voltage Vp of the PFC converter 10, produced on a line 12 relative to a zero-volt (0V) line 13 connected to ground as shown, being connected as an input voltage for the LLC converter 11. The cascaded PFC and LLC power converters 10 and 11 are controlled as described further below by a PFC and LLC control unit 14, which has a ground connection Gnd connected to the line 13.

AC power supplied to an input of the power supply arrangement is rectified by a diode bridge 15. A positive rectified AC output of the diode bridge 15 is coupled via a line 16 to a positive voltage input of the PFC converter 10, and a return path is provided from the 0V line 13 to the diode bridge 15 via a current sensing resistor 17. By way of example, the line 16 may have a peak voltage in a range of about 125V to about 360V, depending on a voltage of the AC power, and the voltage Vp on the line 12 may be about 385V.

The PFC converter 10 shown in FIG. 1 comprises a conventional boost converter including an input inductor 18 and a diode 19 coupled in series between the line 16 and the line 12, a controlled switch 20, typically constituted by a MOSFET, coupled between a junction of the inductor 18 with the diode 19 and the 0V line 13, and an output capacitor 21 coupled between the lines 12 and 13. The switch 20 is controlled to be opened and closed by an output P of the control unit 14. Another output S of the control unit 14, not connected in FIG. 1, is provided for complementary control (with dead times) of a secondary switch (not shown) which may be provided in other forms of PFC converter.

A voltage divider comprising resistors 22 and 23 connected in series between the lines 12 and 13 supplies to a voltage feedback input Vfb of the control unit 14 a voltage proportional to the output voltage Vp of the PFC converter 10. Within the control unit 14, this voltage is supplied to a transconductance amplifier having an output coupled to a compensation point Vcom of the control unit 14, from which a capacitor 24, and a resistor 25 in series with a capacitor 26, are connected to ground or 0V. A negative voltage (relative to ground or 0V), produced at the junction of the current sensing resistor 17 with the diode bridge 15 and proportional to input current of the PFC converter 10, is coupled to another input Vis of the control unit 14 via a low pass filter constituted by a series resistor 27 and a shunt capacitor 28.

It is noted that the control unit 14 does not monitor the input voltage of the PFC converter 10, but only the input current and the output voltage Vp. The control unit 14 controls an off-time duty cycle Doff of the PFC converter switch 20 in accordance with:

$$Doff = Vi/Vp = Re \cdot Is/Vp$$

where Vi is the input voltage on the line 16, Is is the input current sensed by the current sensing resistor 17, and Re is the equivalent load of the PFC converter reflected to its input, over a wide frequency range to provide a near-unity power factor for the power supply arrangement.

The LLC converter 11 has a half bridge topology comprising a primary switch 29 between the converter input voltage line 12 and a junction point 30, and a secondary switch 31 between the junction point 30 and a line 32 of the converter. The switches 29 and 31, which typically comprise MOSFETs, are controlled in a complementary manner, with dead times so that they are not simultaneously conductive, by outputs A and B respectively of the control unit 14. The line 32 is coupled to the 0V line 13 via a current sensing resistor 33 providing a return path of the LLC converter 11, and is connected to an input OvL of the control unit 14 to which it supplies a voltage proportional to input current of the LLC converter 11.

The junction point 30 is coupled to an output junction 36 of the LLC converter 11 via a capacitor 34 and a series inductor 35, the junction 36 being coupled via another inductor 37 to the line 32. The inductors 35 and 37, and the capacitor 34, constitute the LLC components of the converter 11. Outputs of the LLC converter 11 are taken from secondary windings of a transformer 38, which has a primary winding connected between the junction 36 and the line 32. In FIG. 1 the transformer 38 is represented as an "ideal" transformer, separate from the inductors 35 and 37. In practice, part or all of the inductances of the inductors 35 and 37 can be constituted by leakage and magnetizing inductances of the transformer 38, so that functions of these inductors and the transformer are combined.

The transformer 38 can have any desired number of secondary windings; three secondary windings 39, 40, and 41 are shown by way of example in FIG. 1. The winding 39 has a centre tap, connected to a secondary side ground, and ends connected via full wave rectifier diodes 42 to an output 43. A smoothing capacitor 44 is connected between the output 43 and the secondary side ground, so that the output 43 provides a DC voltage output for equipment (not shown) powered by the power supply arrangement. A voltage divider, comprising resistors 45 and 46 connected in series between the output 43 and the secondary side ground, provides a voltage feedback for the LLC converter 11 as is further described below.

The secondary winding 40 is coupled to a diode bridge 47 whose negative output is connected to the primary side ground or 0V and whose positive output, smoothed by a capacitor 48 connected between this positive output and the 0V line 13, provides a supply voltage to an input Vcc of the control unit 14 for powering the control unit in a bootstrapped manner. To this end, a high impedance resistor 49 is also connected between the output line 12 of the PFC converter 10 and the input Vcc.

On connection of AC power to the power supply arrangement of FIG. 1, a small current flows via the inductor 18, diode 19, and resistor 49 to charge the capacitor 48, and the supply voltage at the input Vcc of the control unit 14 rises. On this reaching a start-up voltage of, for example, about 13V, this is detected by the control unit 14 which accordingly starts to drive the LLC converter 11, thereby to produce an output voltage via the secondary winding 40 and the diode bridge 47 to maintain charge of the capacitor 48 to a desired operating voltage of the control unit 14, for example about 12V. The initial operation of the control unit 14 reduces the charge of the capacitor 48, but not sufficiently to fall below a shut-down threshold voltage, of for example about 8.5V.

The secondary winding 41, to which no connections are shown in FIG. 1, is representative of any number of other secondary windings of the transformer 38 which may be used to provide other desired AC and/or DC outputs at high or low voltages, as may be desired. It can be appreciated that functions of the secondary windings can be combined, so that the transformer 38 can have one or more secondary windings.

The supply voltage at the input Vcc of the control unit 14 can be used by the control unit 14 to provide a sufficiently high voltage to drive the switches 20, 29, and 31 of the converters 10 and 11. In addition, the control unit 14 uses this supply voltage to produce at an output Vref a regulated supply voltage; this supply voltage is also used within the control unit 14 for powering most of its circuits. In addition, using the unregulated and/or regulated supply voltages the control unit 14 powers a bandgap voltage reference (not shown) and derives various threshold voltages for use in operation of the control unit. By way of example, the regulated supply voltage is assumed to be 3.3V as shown in FIG. 1, and other voltages and voltage ranges referred to below are given in the context of this supply voltage.

A resistor 50 is connected between the output Vref of the control unit 14 and an input Fmax of the control unit, to which it supplies a current which determines a desired maximum switching frequency of the LLC converter 11. Another resistor 51 is connected between the output Vref of the control unit 14 and an input Fdbk of the control unit, to which it supplies a current which determines a desired minimum switching frequency of the LLC converter 11. An electrically isolating voltage-to-current (V-I) converter 52 produces at its output an error current which is supplied via a series resistor 53 and a diode 54 to the input Fdbk of the control unit 14 for feedback control of the frequency of the LLC converter 11 within the range determined by the resistors 50 and 51. This feedback error current is proportional to a difference between the voltage at the junction between the resistors 45 and 46, supplied to the converter 52 and representing the voltage at the DC output 43, and a reference voltage (not shown), and can be produced in a frequency compensated manner for example along the lines shown in FIG. 1 of STMicroelectronics Application Notes AN2321, "Reference design: high performance, L6599-based HB-LLC adapter with PFC for laptop computers", August 2006.

An additional circuit, comprising a resistor 55 in series with a capacitor 56 between the input Fdbk and the output Vref of the control unit 14, and optionally with a diode 57 in parallel with the resistor 55 as shown in FIG. 1, provides for a soft start of the LLC converter 11 under no-load or light load conditions, whereby the switching frequency is reduced gradually from its maximum to a normal operating value.

Figure 2:
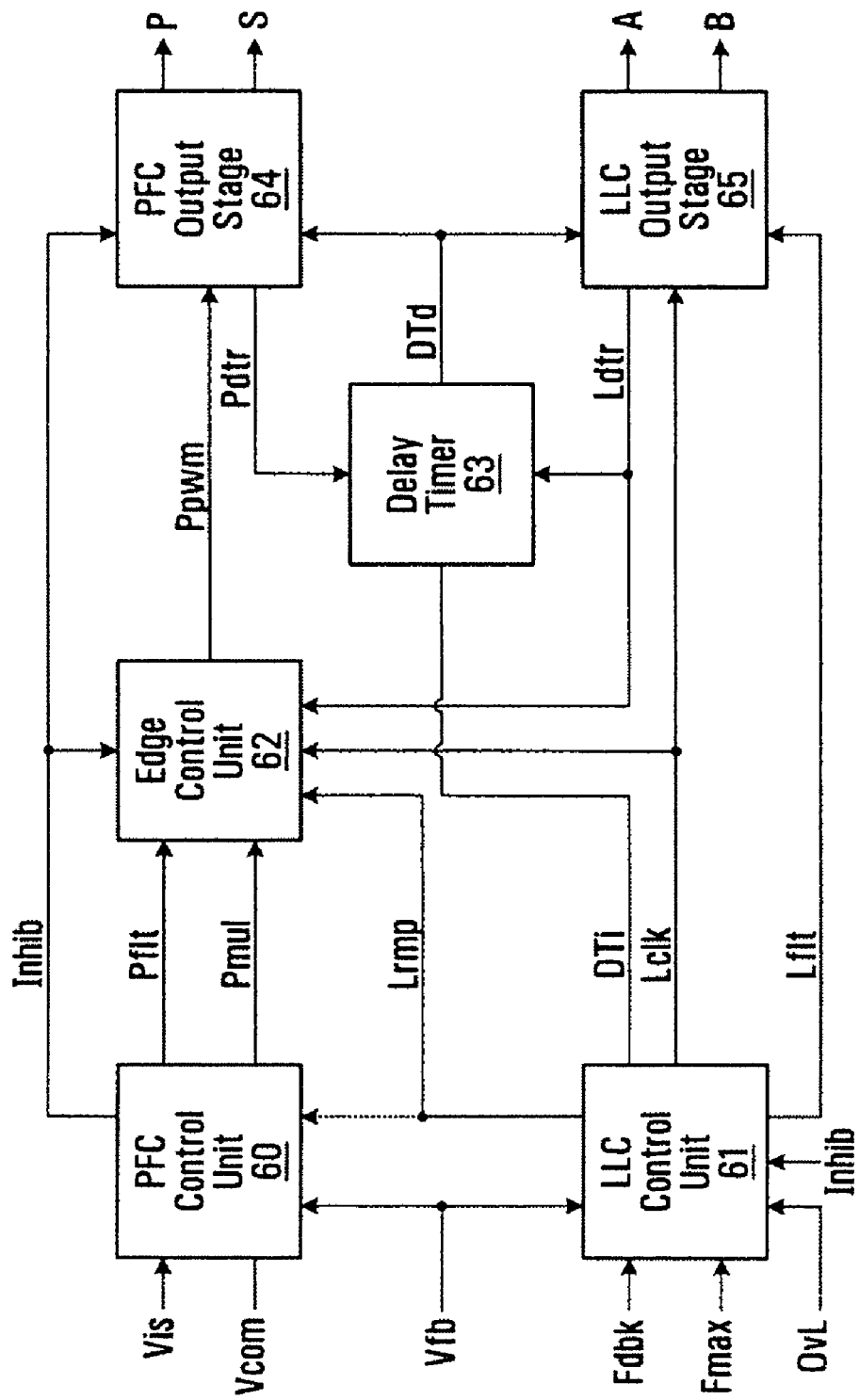
FIG. 2 illustrates in a block diagram parts of one form of a PFC and LLC control unit of the control arrangement of FIG. 1.

FIG. 2 shows a block diagram of parts of one form of the PFC and LLC control unit 14 of the power supply control arrangement of FIG. 1. These parts comprise a PFC control unit 60, an LLC control unit 61, an edge control unit 62, a delay timer 63, a PFC output stage 64, and an LLC output stage 65. For simplicity other parts of the control unit 14, such as for voltage regulation, producing desired threshold voltages, programming desired settings, and test purposes, are not shown.

Except for the connections Gnd, Vcc, and Vref which are not shown in FIG. 2, FIG. 2 shows the same external connections of the control unit 14, using the same references, as FIG. 1. These references are also used to refer to signals at the respective connections. FIG. 2 also shows various signals that are produced within and exchanged among various parts of the control unit in operation, as described further below. Functions of the blocks shown in FIG. 2 and the related signals are briefly described as follows.

The PFC control unit 60 is supplied with the PFC current sensing voltage Vis and the PFC feedback voltage Vfb, and also has a connection to the compensation point Vcom to which the components 24 to 26 are connected as described above. These components are selected for a voltage at the point Vcom of typically 0.5 to 2.5V with a PFC control loop bandwidth of the order of about 10 to 20 Hz. The PFC control unit 60 compares the feedback values Vis and Vfb with over-current and over-voltage threshold values respectively, and in response to an over-current or over-voltage condition of the PFC converter 10 determined by these comparisons it produces a PFC fault signal Pflt which is supplied to the edge control unit 62. The PFC control unit 60 also compares the feedback voltage Vfb with an inhibit threshold voltage, and in response to an under-voltage condition (e.g. in the event of AC brown-out or failure) determined by this comparison produces an inhibit signal Inhib which is supplied to the LLC control unit 61, the edge control unit 62, and the PFC output stage 64.

In normal operating conditions, the PFC control unit 60 processes the feedback signals Vis and Vfb to produce a signal Pmul, which is supplied to the edge control unit 62, which is directly proportional to the off-time duty cycle Doff required for the PFC converter 10 at any instant to provide the desired power factor correction in accordance with the above equation for Doff. Thus throughout each rectified AC cycle of the PFC input voltage on the line 16 in FIG. 1, the off-time duty cycle Doff, as represented by the signal Pmul, is varied by the PFC control unit 60 to present an equivalent substantially resistive load to the AC supply. By way of example, the signal Pmul can have a value from 0 to 2.0V for representing off-time duty cycles from 0 to 100%.

The PFC control unit 60 can optionally use a ramp signal Lrmp, which is produced by the LLC control unit 61 as described below, which can be supplied to the PFC control unit 60 as shown by a dashed line in FIG. 2.

The LLC control unit 61 is supplied with the signal Fdbk, which as described above is a current representing an error voltage of the LLC converter, and uses this to produce a controlled frequency square waveform clock signal Lclk which is supplied to the LLC output stage 65, and also to the edge control unit 62. The LLC control unit 61 also produces a sawtooth or ramp signal Lrmp which is supplied to the edge control unit 62 and, optionally as described above, to the PFC control unit 60. For example the ramp signal Lrmp has an amplitude from 0 to 2.0V and a frequency which is twice the frequency of the clock signal Lclk. As indicated above, a minimum frequency of the LLC clock signal Lclk is set by a minimum current supplied to the input Fdbk via the resistor 51, and a maximum frequency of the LLC clock signal Lclk is set by the resistor 50 supplying a current via the input Fmax to a current mirror arrangement in the LLC control unit 61. For example the maximum frequency may be set to a value about 2 or 3 times a normal LLC operating frequency for a particular application, with the minimum frequency being lower than this normal operating frequency. The normal operating frequency typically is in a narrow frequency range, but may be selected from a wide frequency band, for example of the order of about 50 kHz to about 1 MHz, for any particular application of the LLC converter.

The LLC control unit 61 also produces a signal DTi for the delay timer 63, this signal being a current that is produced by the current mirror arrangement in the LLC control unit 61 in dependence upon the current supplied to its input Fmax. The delay timer 63 determines a dead time in dependence upon the current signal DTi, so that the dead time is adjusted for the wide range of possible LLC frequencies.

In addition, the LLC control unit 61 is supplied with the inhibit signal Inhib to inhibit generation of the signals Lrmp and Lclk when the signal Inhib is asserted. The LLC control unit 61 is further supplied via the input OvL with the voltage dropped across the resistor 33 and representing input current of the LLC converter 11, and compares this with at least one threshold to determine a possible overload condition of the LLC converter, in response to which it produces an LLC fault signal Lflt which is supplied to the LLC output stage 65. The LLC control unit 61 is also supplied with the PFC feedback voltage signal Vfb, which it compares with a threshold to enable start-up of the LLC converter only when the PFC converter output voltage Vp is above a selected level, for example 360V. A soft start function in the LLC control unit 61 operates in conjunction with the components 55 to 57 in FIG. 1 as indicated above to provide a soft start when the LLC converter is enabled and after any overload fault.

The edge control unit 62 compares the duty cycle signal Pmul with the LLC ramp signal Lrmp, in a comparator for instance, to produce a PFC PWM switching signal Ppwm with the desired duty cycle, this signal being supplied to the PFC output stage 64. The signal Ppwm is harmonically related to the LLC clock signal Lclk, which is also supplied to the edge control unit 62, conveniently in a 1:1 or same-frequency relationship. The edge control unit 62 produces the signal Ppwm with edges or transitions that are timed to avoid coinciding with edges of the signal Lclk, for minimum interference, and with a phase for maximum efficiency of the power supply arrangement. To this end the edge control unit 62 is also supplied with a signal Ldtr produced by the LLC output stage 65 as described below, and which is high during dead times of the LLC output stage. The edge control unit 62 is further supplied with the signals Pflt and Inhib, in response to either of which it inhibits the signal Ppwm.

The delay timer 63 is responsive to a PFC delay time request signal Pdtr supplied to it from the PFC output stage 64, or an LLC delay time request signal Ldtr supplied to it from the LLC output stage 65, to produce a delay time done signal DTd, which is supplied to each of these output stages 64 and 65, after a delay time that is determined as indicated above by the signal DTi, whereby the delay time is adjusted to suit the normal operating frequency of the LLC converter 11 (and the switching frequency of the PFC converter 10 which is here assumed to be the same).

The PFC output stage 64 comprise a level shifter and gate driver for producing the output P for driving the primary switch 20 of the PFC converter 10 in accordance with the signal Ppwm and unless it is inhibited by the signal Inhib, with a similar arrangement for driving the output S in a complementary manner, with dead times, to avoid undesired simultaneous conduction of PFC converter switches, provided by the delay timer 63 as described above. The PFC output stage 64 can include more complex arrangements for producing various relative timings of its output signals P and S to suit different switching arrangements that may be required for different types of PFC converter.

The LLC output stage 65 also comprises level shifters and gate drivers for producing its output signals A and B for driving the switches 29 and 31 respectively of the LLC converter 11, unless these are inhibited by the signal Lflt, at the frequency of the signal Lclk and with dead times, to avoid simultaneous conduction of the switches 29 and 31, provided by the delay timer 63 as described above.

Particular forms of the PFC control unit 60 are described in greater detail and by way of example below.

Figure 3:
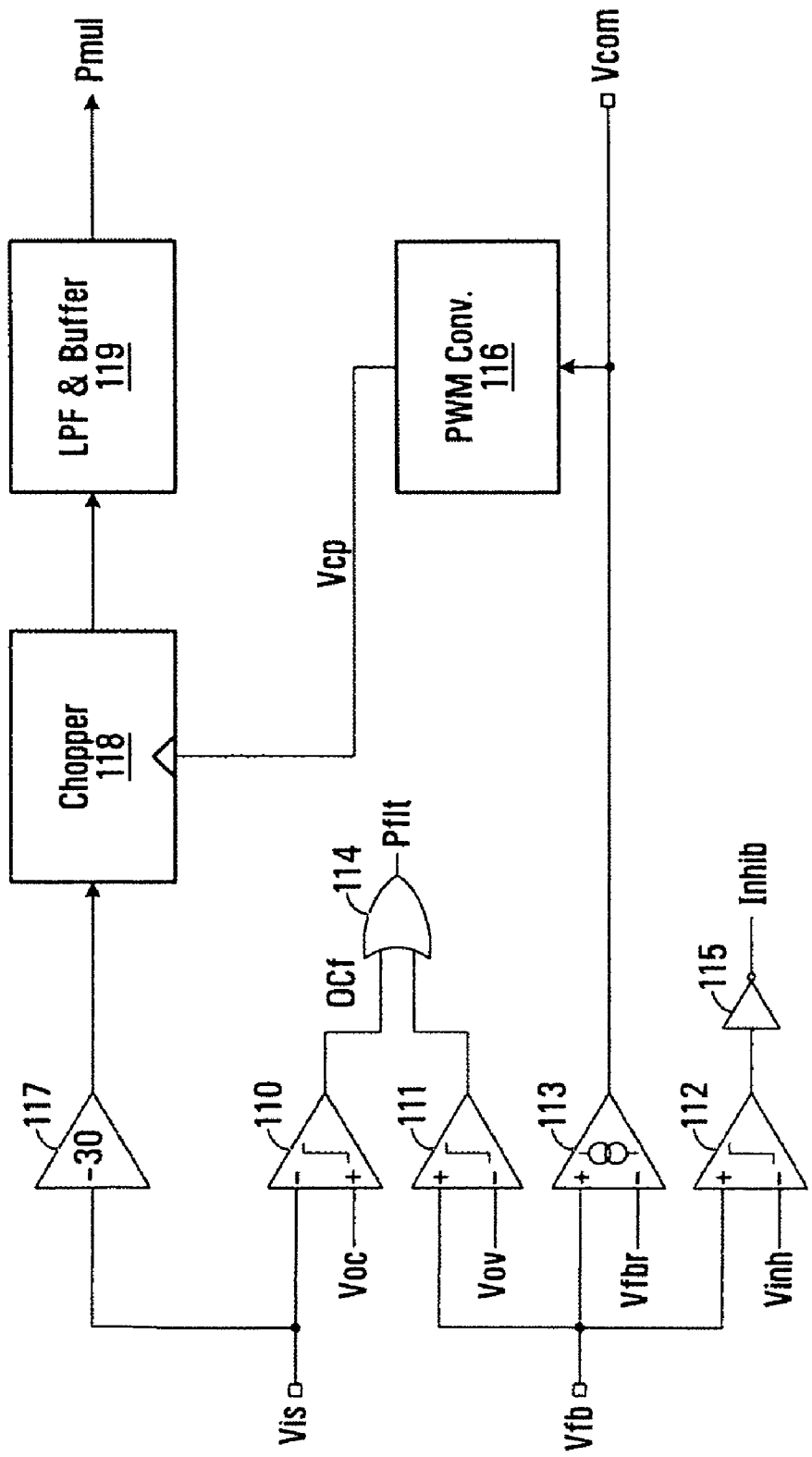
FIG. 3 shows a block diagram of a PFC control unit of the PFC and LLC control unit of FIG. 2.

FIG. 3 shows by way of example a block diagram of a particular form of the PFC control unit 60, with the inputs Vfb and Vis and the point Vcom to which connections are made as shown in FIG. 1. The PFC control unit as shown in FIG. 3 comprises comparators 110 to 112, a transconductance amplifier 113, an OR gate 114, an inverter 115, a PWM converter 116, an amplifier 117, a chopper 118, and a low pass filter (LPF) and buffer 119.

The feedback voltage at the input Vfb is supplied to a non-inverting input of each of the comparators 111 and 112, whose inverting inputs are supplied with respective threshold voltages Vov and Vinh, and to a non-inverting input of the transconductance amplifier 113, whose inverting input is supplied with a feedback reference voltage Vfbr and whose output is connected to the compensation point Vcom, to which the compensation components 24 to 26 are connected as described above. For example, for a supply voltage of at least 3V and assumed here to be 3.3V, the voltage Vfbr may be about 2.2V, and the resistances of the resistors 22 and 23 (FIG. 1) are selected so that the input Vfb is equal to this (2.2V) when the PFC output voltage Vp has a desired value, for example 385V as described above.

In the event that the feedback voltage Vfb falls below the threshold Vinh, constituting an inhibit threshold of for example 0.5 to 0.6V, the comparator 112 changes state to produce a high level of the signal Inhib at the output of the inverter 115. In the event that the feedback voltage exceeds the threshold voltage Vov of for example 2.3 or 2.4V, the comparator 111 changes state to indicate an overvoltage by providing a high level at its output, thereby producing a high level of the signal Pflt via the OR gate 114. It is observed that these and other threshold voltages can be provided with hysteresis to facilitate providing stable comparator outputs. It is also observed that the threshold voltages can be derived from a resistor chain which is calibrated for the feedback reference voltage Vfbr, so that all of the threshold voltages are correlated. Calibration can be performed by monitoring the point Vcom, so that it takes into account any offset of the transconductance amplifier 113.

As described above, the components 24 to 26 are selected for a voltage at the point Vcom of typically 0.5 to 2.5V, with a PFC control loop bandwidth of the order of about 10 to 20 Hz, for a normal range of the feedback voltage Vfb. The output of the transconductance amplifier 113 at the point Vcom is supplied to the PWM converter 116, which produces at its output a signal Vcp which is a PWM signal dependent upon the voltage at the point Vcom. Various alternative forms of the PWM converter 116 are described below with reference to FIGS. 7 to 9.

The input Vis, which has a small negative voltage dependent upon the sensed input current of the PFC converter 10, low pass filtered by the components 27 and 28 to reduce noise as described above, is connected to an inverting input of the comparator 110, a non-inverting input of which is supplied with an over-current threshold voltage Voc so that in the event of an over-current condition a signal OCf produced at the output of the comparator 110 becomes high to indicate an over-current fault, producing a high level of the signal Pflt via the OR gate 114.

The input voltage Vis is also supplied to the input of the amplifier 117, which for example has a gain of −30 as indicated in FIG. 3. An output of the amplifier 117 is switched or chopped with the signal Vcp by the chopper 118, and the output of the chopper 118 is filtered and buffered by the low pass filter and buffer 119 to produce the signal Pmul at its output.

Figure 4:
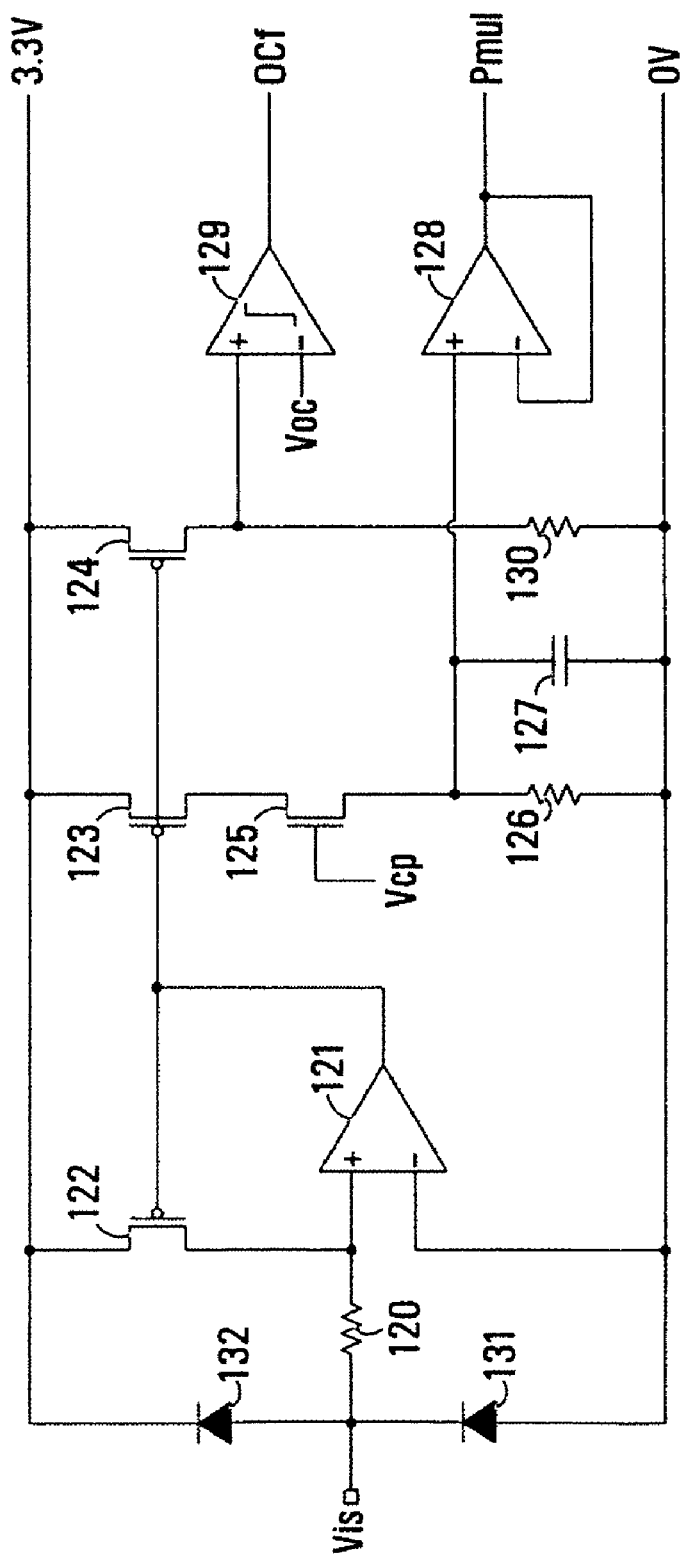
FIG. 4 illustrates some parts of the PFC control unit of FIG. 3 in greater detail.

A convenient form of the parts 110 and 117 to 119 of the PFC control unit of FIG. 3 is schematically illustrated in FIG. 4, in which the input Vis is connected via a resistor 120 to a non-inverting input of a differential amplifier 121, which has its inverting input connected to a 0V line and its output connected to the gates of P-channel transistors 122 to 124 whose sources are connected to the 3.3V supply voltage line. The transistor 122 has its drain connected to the non-inverting input of the amplifier 121. The transistor 123 has its drain coupled via the drain-source path of an N-channel transistor 125 to a junction of a resistor 126 and a capacitor 127 connected in parallel to the 0V line. This junction is also connected to a unity-gain buffer amplifier 128 whose output provides the signal Pmul. The gate of the transistor 125 is supplied with the signal Vcp. The drain of the transistor 124 is connected to a non-inverting input of a comparator 129, whose inverting input is supplied with the over-current threshold voltage Voc and whose output provides the signal OCf, and via a resistor 130 to the 0V line. FIG. 4 also shows conventional protection diodes 131 and 132 connected between the input Vis and the 0V and 3.3V voltage lines.

The components 120 to 123 and 126 constitute the amplifier 117 of FIG. 3, the transistor 125 constitutes the chopper 118 of FIG. 3, the capacitor 127 and amplifier 128 add the functions of the LPF and buffer 119 of FIG. 3, and the components 124, 129, and 130 add the function of the comparator 110 of FIG. 3. For example, the resistor 120 can have a resistance of 100 kΩ, and the resistor 126 can have a resistance of 3 MΩ, so that their ratio of 30 gives the magnitude of the gain of the amplifier 117 as described above.

In operation of the control arrangement, a negative voltage between 0V and about −0.5V, proportional to the input current of the PFC converter 10, is supplied to the input Vis. The amplifier 121 maintains a virtual ground at its non-inverting input, so that the resistor 120 conducts a current out of the input Vis, equal to the magnitude of the input voltage Vis divided by the resistance of the resistor 120. This current is supplied via the transistor 122, and a corresponding mirrored current is passed by the transistor 123 when the transistor 125 is turned on by the PWM signal Vcp. Consequently a positive voltage, which is 30 times the negative input voltage Vis multiplied by the on-time duty cycle of the PWM signal Vcp, is dropped across the resistor 126. This voltage is smoothed by the capacitor 127, forming the LPF with a pole at a frequency for example in a range from about 1 kHz to about 10 kHz, and the smoothed voltage is buffered by the buffer amplifier 128 and reproduced at its output as the signal voltage Pmul. The low pass filter not only filters out the chopper frequency, but also serves in effect to average the sensed input current signal at the input Vis.

The transistor 124 and the resistor 130 also pass a mirrored current to produce a voltage drop across the resistor which the comparator 129 compares with the threshold voltage Voc to produce the over-current signal OCf. Hysteresis can be provided for the comparator 129 by using its output to select different resistance values for the resistor 130.

It is evident that the voltage dropped across the resistor 126 is limited to being less than the supply voltage, e.g. 3.3V. Without the chopper function provided by the PWM signal Vcp and the transistor 125, the gain of −30 provided by the circuit of FIG. 4 (the amplifier 117 of FIG. 3) could only be attained for input voltages Vis from 0V to about −0.1V. For a desirably larger input voltage range, such as a range from 0 to about −0.5V, without the chopping function the gain of the amplifier 117 would have to be restricted to be less than about 6 (about 3V divided by about 0.5V). These undesirable constraints are avoided by the circuit of FIG. 4, because the dynamic range of the voltage produced across the resistor 126 is limited by the chopping function of the transistor 125. A relatively large magnitude of the input voltage Vis coincides with a relatively small on-time duty cycle of the PWM signal Vcp, and a large on-time duty cycle of the PWM signal coincides with a small input voltage Vis, so that in either case in normal operation the voltage produced across the resistor 126 is less than the supply voltage, because the gain of the amplifier 117 is multiplied by the on-time duty cycle of the chopper 118 in producing this voltage.

The diodes 131 and 132 serve in known manner for protection against external voltages, beyond the supply voltages, at the input Vis, for example due to electrostatic discharge. An external resistor, having a relatively low resistance, can be connected in series with the input Vis to limit current through the protection diode 131 or 132 due to such an external voltage. However, in normal operation as the input voltage Vis becomes more negative, the diode 131 begins to become forward biased, producing an input leakage current which can decrease the accuracy of the current sensing.

Figure 5:
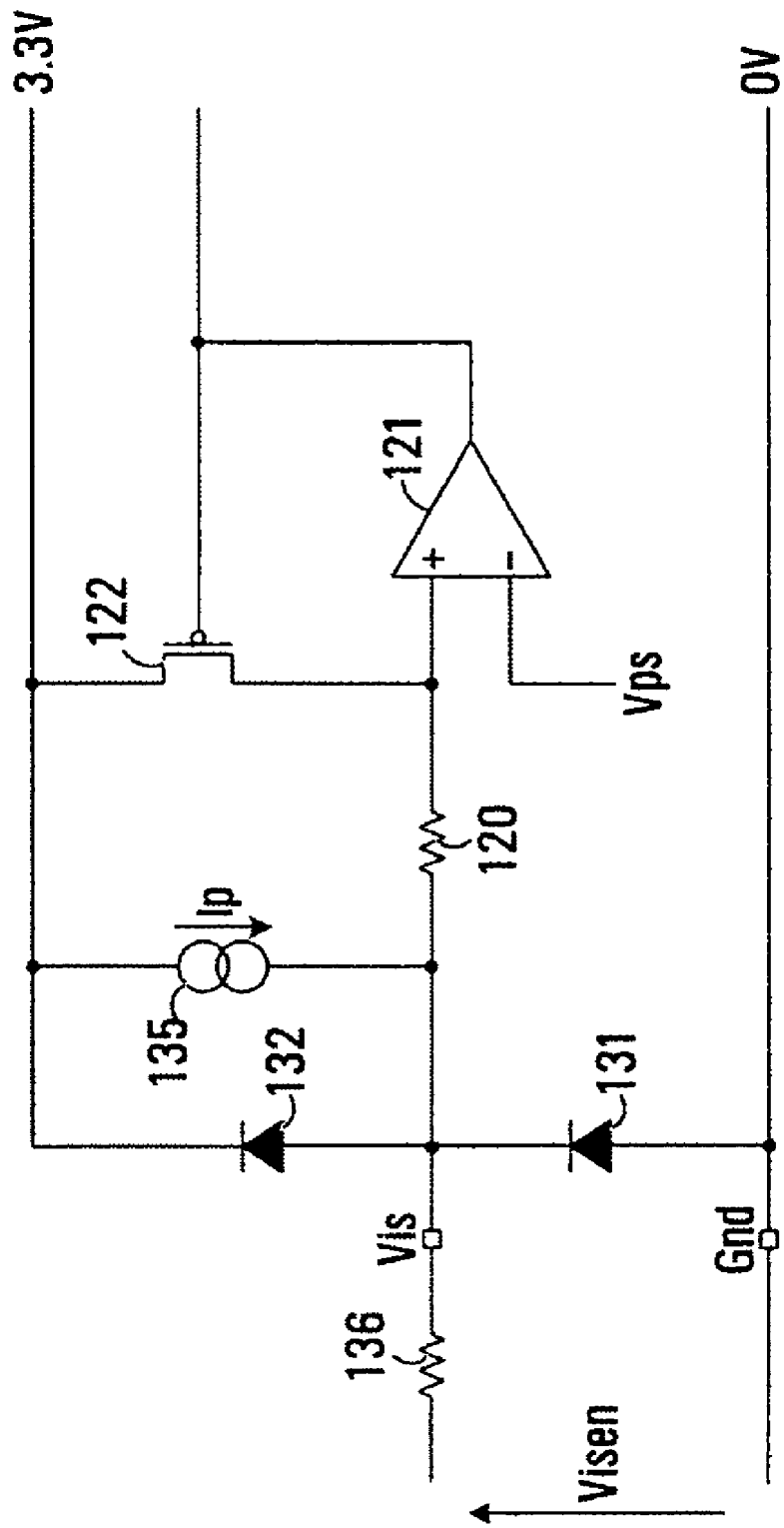
FIGS. 5 and 6 schematically illustrate alternative forms of part of the PFC control unit of FIG. 3.
Figure 6:
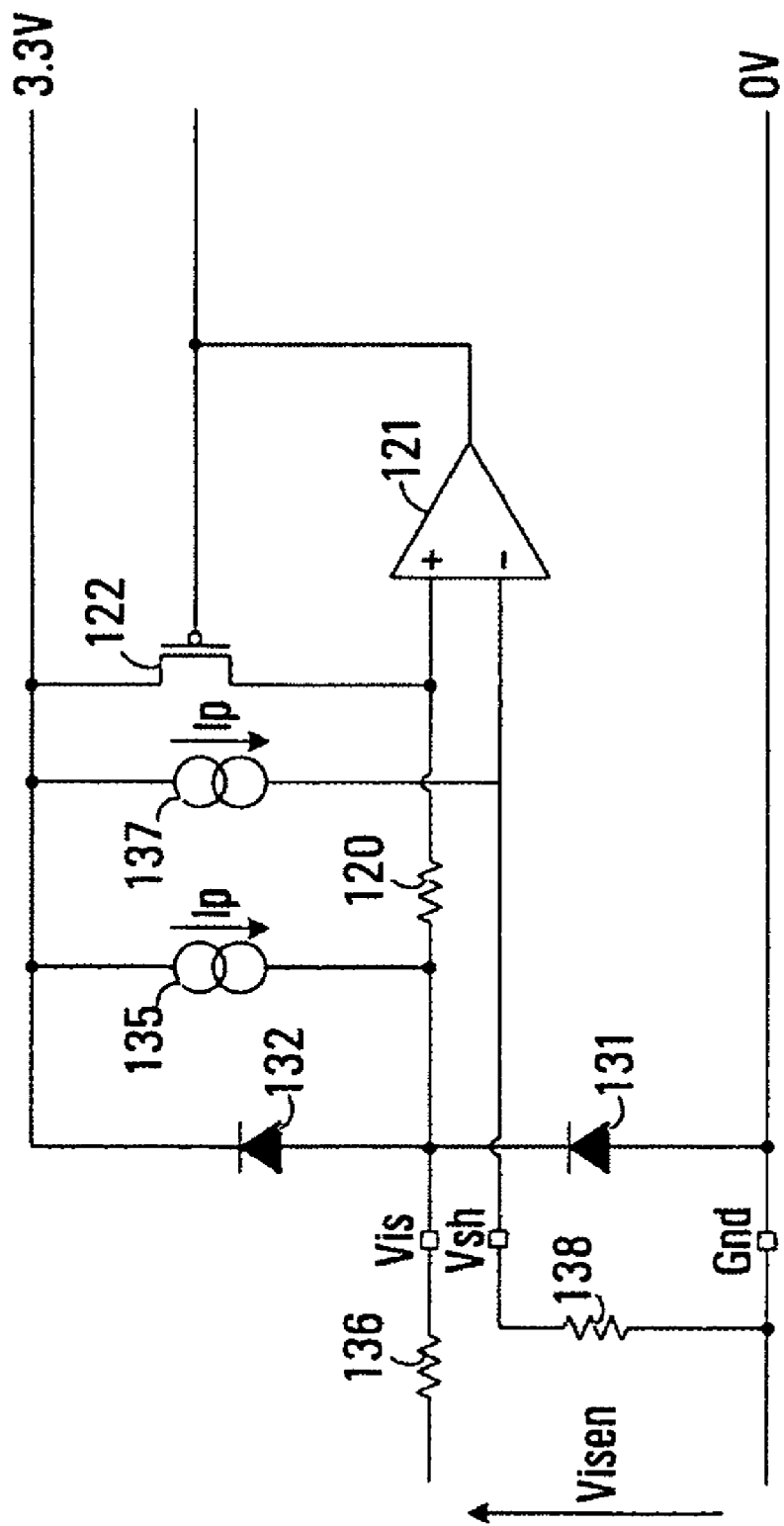

This can be reduced or avoided by shifting the voltage at the input Vis and at the inputs of the amplifier 121 in a positive direction by a small amount, for example up to about 0.6V, so that the diode 131 is not forward biased for any normal converter current sensing conditions. FIGS. 5 and 6 schematically illustrate alternative forms of part of the PFC control unit providing such voltage shifting.

Referring to FIG. 5, this shows the components 120 to 122 and the protection diodes 131 and 132, connected in the same manner as in the circuit of FIG. 3 except that the inverting input of the amplifier 121 is supplied with a fixed voltage Vps. In addition, a constant current source 135, supplying a current Ip, is connected between the 3.3V supply voltage rail and the input Vis, and the negative voltage representing the sensed PFC converter input current, shown in FIG. 5 as a voltage Visen with respect to the ground or 0V connection Gnd, is supplied to the input Vis via a series resistor 136. For example, the constant current Ip can be produced by a current mirror, such that it is determined by the external resistor 50 which determines a maximum current Ifmax corresponding to a maximum frequency of the LLC converter 11. For any particular relationship among the parameters Vps, Ip, and Ifmax, the resistance of the resistor 136 can be a constant multiple of the resistance of the resistor 50.

For example, the voltage Vps can be 0.5V, the current Ip can be 5 μA, the resistor 120 can have a resistance of 100 kΩ, and the resistor 136 can have a resistance of 50 kΩ. In this case the current Ip flowing through the resistor 136 drops a voltage of 0.5V equal to the voltage Vps, and for voltages Visen from 0V to −0.5V the current supplied via the transistor 122 is from 1.67 μA to 5 μA. Without the constant current source 135 and the resistor 136, the current supplied via the transistor 122 would range from 0 to 5 μA; this difference is compensated by an increase of the voltage Vcom at the output of the amplifier 113 by a factor 1+(R136/R120), where R136 is the resistance of the resistor 136 and R120 is the resistance of the resistor 120.

FIG. 6 shows a similar arrangement to that of FIG. 5, except that it provides the voltage Vps at the inverting input of the amplifier 121 by passing another constant current Ip, produced by a constant current source 137 which can comprise a further current mirror transistor, through an additional resistor 138 to ground. As shown in FIG. 6, the resistor 138 can be external to an IC implementing the control unit, which accordingly in this case has a further connection point Vsh. This facilitates matching the voltage shifts at the inputs of the amplifier 121, because the currents Ip produced by the constant current sources 135 and 137 can be closely matched.

As described above, the normal range of the voltage Vcom is from 0.5 to 2.5V. The PWM converter 116 is arranged to convert the voltage Vcom to the PWM signal Vcp with an offset so that a minimum Vcom voltage of 0.5V corresponds to 0% duty cycle, and a maximum Vcom voltage of 2.5V corresponds to 100% duty cycle, of the signal Vcp. This provides a significant advantage in avoiding low voltage swings of the output of the error voltage amplifier, constituted by the transconductance amplifier 113, which can be difficult for an IC amplifier to provide, especially in a linear manner as is desired.

Figure 7:
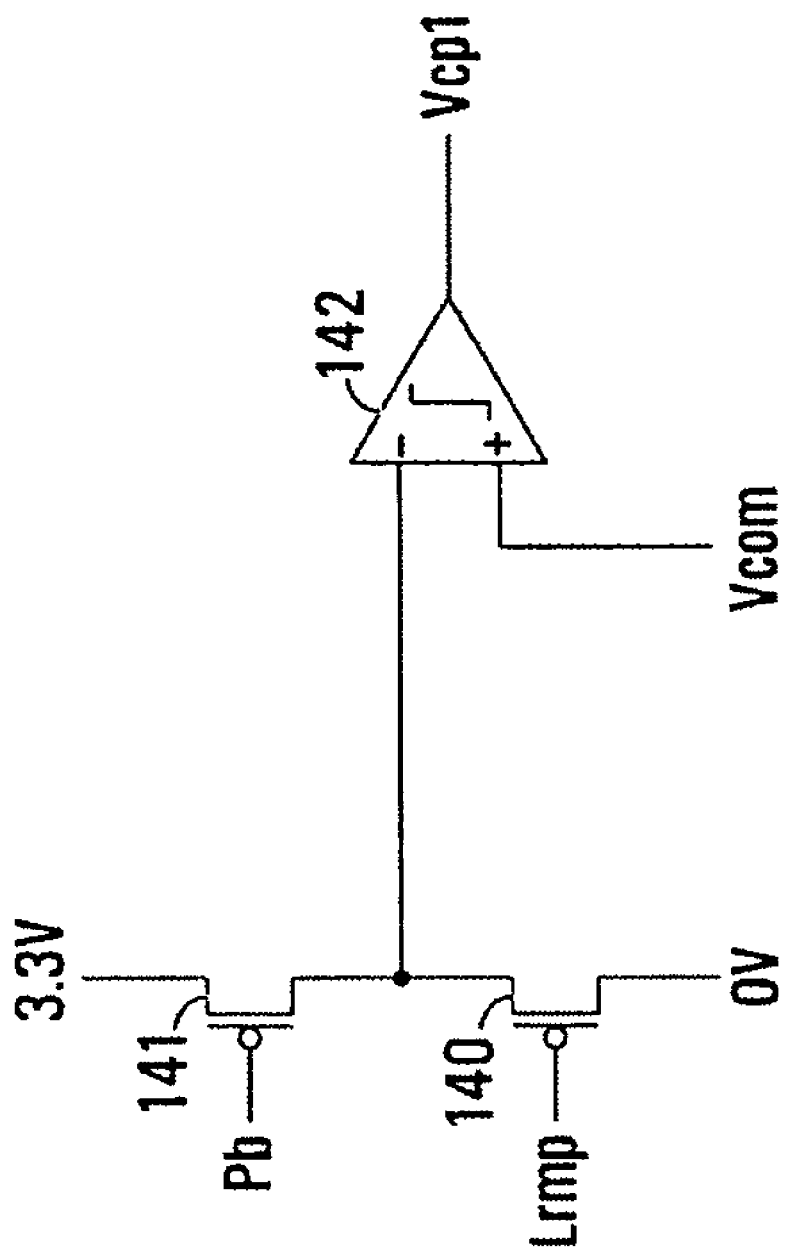
FIGS. 7, 8, and 9 schematically illustrate alternative forms of a PWM converter of the PFC control unit of FIG. 3.
Figure 8:
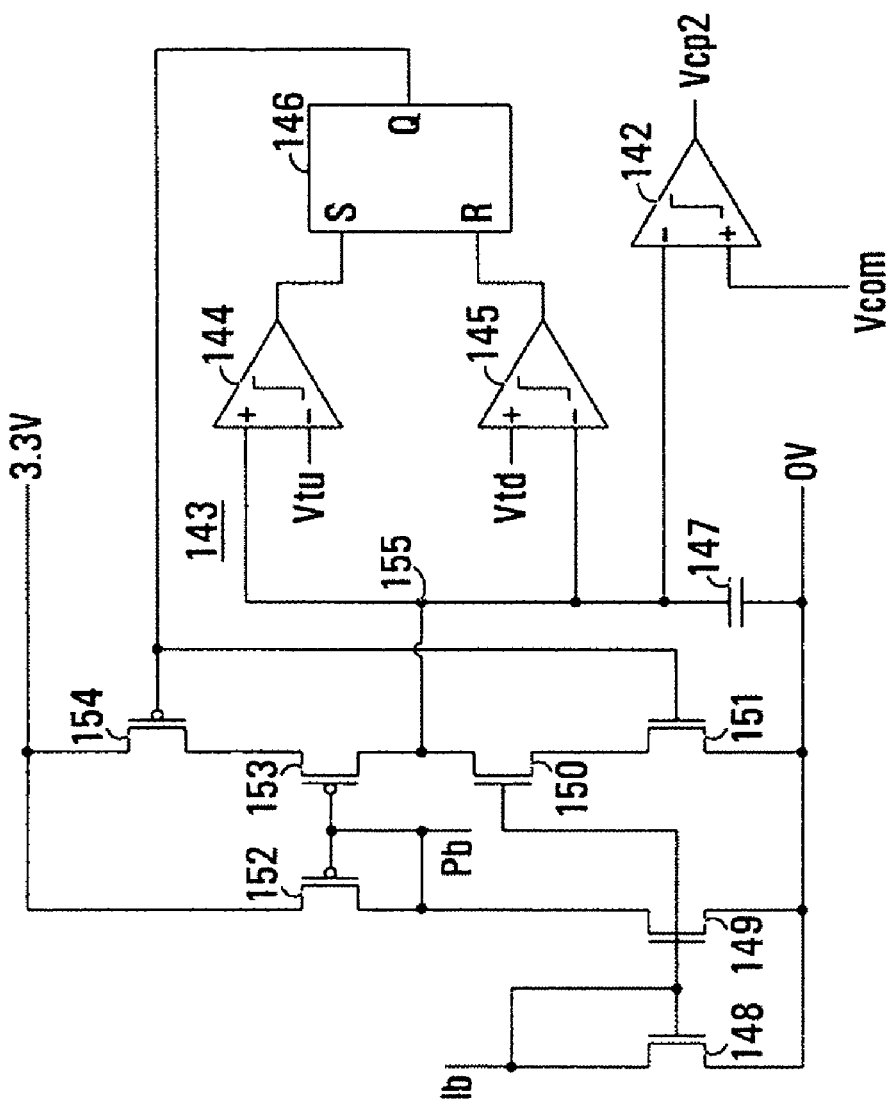
Figure 9:
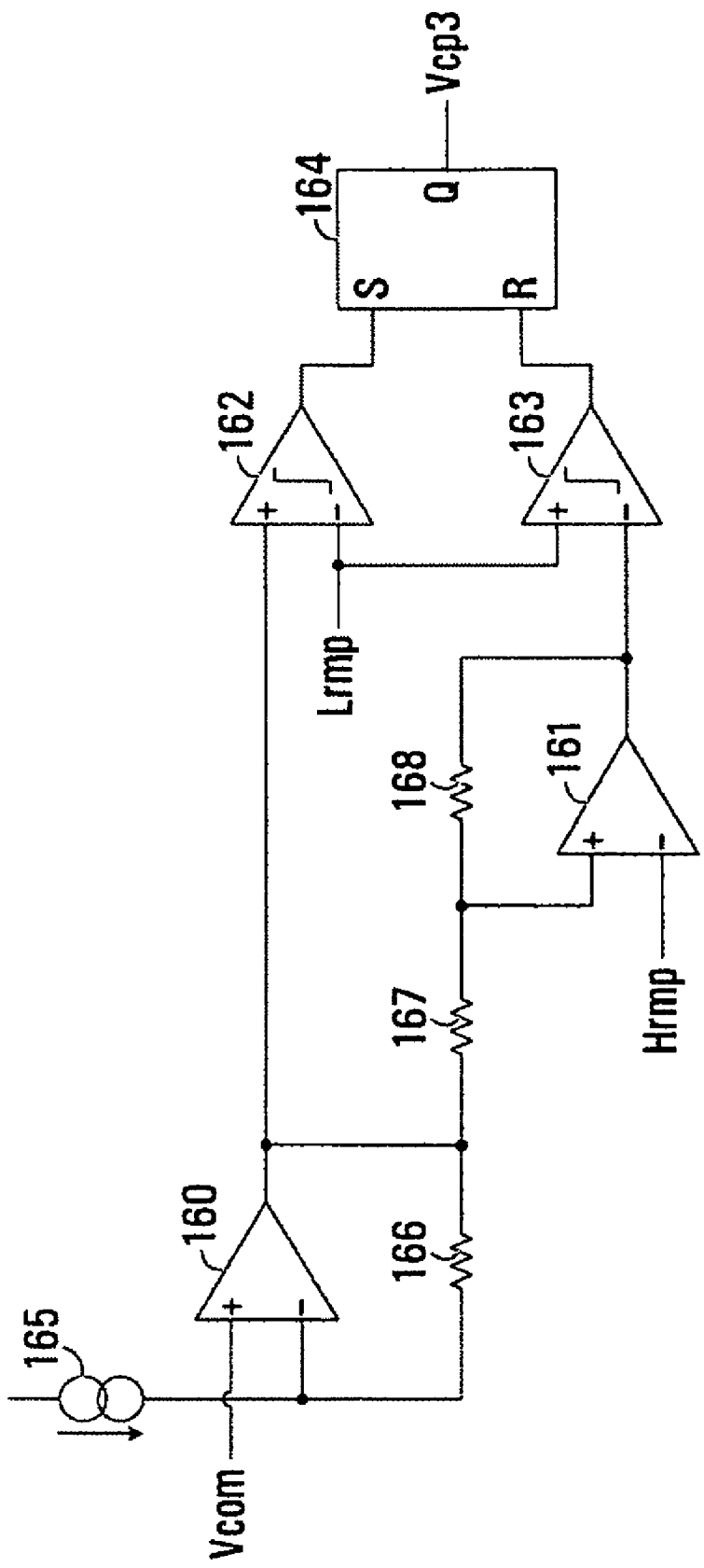

To this end, the PWM converter 116 compares the voltage Vcom with a ramp signal, having a range of about 0.5 to about 2.5V, to produce the PWM signal Vcp. FIGS. 7 to 9 illustrate alternative forms of the PFC converter 116, any of which can be used in particular circumstances. Conveniently, more than one of these forms of the PWM converter 116 can be provided in an IC and one of them can be selected by programming of the IC.

The form of the PWM converter 116 shown in FIG. 7 comprises P-channel transistors 140 and 141 and a comparator 142 producing an output signal Vcp1 which can constitute the PWM signal Vcp. The transistor 140 has its gate supplied with the LLC ramp signal Lrmp from the LLC control unit 61 as described above, its drain connected to the 0V line, and its source connected to the drain of the transistor 141, whose source is connected to the 3.3V supply voltage line and whose gate is connected to a bias voltage Pb, which may be produced as described below with reference to FIG. 8. The source of the transistor 140 is also connected to the inverting input of the comparator 142, whose non-inverting input is supplied with the voltage Vcom.

The LLC ramp signal Lrmp, which has a voltage from 0V to 2.0V as described above, is shifted in a positive direction by the gate-source threshold voltage of the transistor 140, which is typically from 0.4 to 0.9V. Consequently, the ramp voltage supplied to the inverting input of the comparator in this case is approximately equal to the optimum range of 0.5 to 2.5V for the voltage Vcom as described above. The frequency of the PWM signal Vcp1, which is relatively arbitrary because it is filtered out by the LPF 119 described above, is in this case equal to the frequency of the LLC ramp signal Lrmp, which may be desirable for avoiding any risk of beat frequencies arising as the LLC frequency varies.

The form of the PWM converter 116 shown in FIG. 8 comprises a free-running triangular waveform oscillator 143 and a comparator which can be the same as the comparator 142 of FIG. 7 and accordingly has the same reference. The oscillator 143 comprises comparators 144 and 145, a flip-flop 146, a capacitor 147, N-channel transistors 148 to 151, and P-channel transistors 152 to 154.

As shown in FIG. 8, a bias current Ib is supplied to a current mirror formed by the transistors 148 to 150, and the corresponding current of the transistor 149 is supplied to a current mirror formed by the transistors 152 and 153, so that the transistors 150 and 153 can pass the same current when enabled by outer switches formed by the transistors 151 and 154, whose gates are connected together and to the output Q of the flip-flop 146. The bias voltage Pb referred to above can be derived from the interconnected gates of the transistors 152 and 153.

The interconnected drains of the transistors 150 and 153 are connected to a junction 155, which is connected to the non-inverting input of the comparator 144, to the inverting input of the comparator 145, via the capacitor 147 to the 0V line, and to the inverting input of the comparator 142 as a triangular waveform for comparison with the voltage Vcom. The comparator 144 has an upper threshold voltage Vtu supplied to its inverting input, and its output connected to a set input S of the flip-flop 146, and the comparator 145 has a lower threshold voltage Vtd supplied to its non-inverting input, and its output connected to a reset input R of the flip-flop 146. The threshold voltages Vtd and Vtu are selected to define the desired range of 0.5V to 2.5V for the triangular waveform at the junction 145. To allow for the speed of the circuit components, the threshold voltage Vtd may be a little more than 0.5V, for example about 0.6V, and the threshold voltage Vtu may be a little less than 2.5V, for example 2.4V.

In operation, when the output Q of the flip-flop 146 is low, the transistor 151 is off and the transistor 154 is on to allow current through the transistor 153 to charge the capacitor 147, until the voltage at the junction 155 crosses the upper threshold voltage Vtu, setting the flip flop 146 so that its output Q goes high. Then the transistor 154 is turned off and the transistor 151 is turned on to allow current through the transistor 150 to discharge the capacitor 147, until the voltage at the junction 155 crosses the lower threshold voltage Vtd, whereupon the comparator 145 resets the flip-flop 146 and the cycle repeats.

Ideally, the triangular waveform produced at the junction 155 varies relatively accurately between 0.5 and 2.5V as is desired, in a linear manner due to equal constant current charging and discharging of the capacitor 147 in accordance with the bias current Ib, and the PWM signal Vcp2 produced in this case is unrelated to other operating frequencies of the control arrangement.

In practice, shifting the LLC ramp signal Lrmp up for comparison with the voltage Vcom as in the PWM converter of FIG. 7, with the amount of the shift depending upon the gate threshold voltage of the transistor 140, and generating a sufficiently accurate triangular waveform as in FIG. 8, with the possibility of beat frequencies between this triangular waveform and the LLC ramp signal Lrmp, may not produce sufficiently desirable and reliable results.

Instead, the voltage Vcom can be shifted down, for example as in the form of the PWM converter shown in FIG. 9, which comprises differential amplifiers 160 and 161, comparators 162 and 163, a flip-flop 164, a constant current source 165, and resistors 166 to 168.

Referring to FIG. 9, the amplifier 160 has the voltage Vcom supplied to its non-inverting input, and its output coupled via the resistor 166 to the inverting input of the amplifier. The source 165 supplies a constant current to the resistor 166 to produce a constant voltage of 0.5V across the resistor 166. Accordingly, the output of the amplifier 160 has a voltage of Vcom−0.5V. The amplifier 160 is constructed from P-channel transistors to permit its output voltage to go to substantially 0V.

The amplifier 161, also constructed from P-channel transistors for the same reason, has a voltage Hrmp, equal to half the maximum amplitude of the LLC ramp signal Lrmp, in this example 1.0V for a 2.0V ramp, supplied to its inverting input. An output of the amplifier 161 is coupled via the resistor 168 to the non-inverting input of the amplifier, and this is coupled via the resistor 167, having the same resistance as the resistor 168, to the output of the amplifier 160. The output voltage of the amplifier 161 is therefore 2(Hrmp)-(Vcom-0.5V).

The output of the amplifier 160 is also supplied to the non-inverting input of the comparator 162, whose inverting input is supplied with the LLC ramp signal Lrmp and whose output is connected to a set input S of the flip-flop 164. Conversely, the output of the amplifier 161 is supplied to the inverting input of the comparator 163, whose non-inverting input is supplied with the LLC ramp signal Lrmp and whose output is connected to a reset input R of the flip-flop 164. The output Q of the flip-flop 164 produces a signal Vcp3 which can constitute the PWM signal Vcp. In this case the comparison range of the signal Vcom is effectively 0.5 to 2.5V as is desired, and the PWM signal has the same frequency as the signal Lrmp.

FIGS. 1 to 9 and the corresponding description above provide illustrative and non-limiting examples of power converters in conjunction with which embodiments of the invention may be used.

As noted above, Doff PFC arrangements can encounter problems at low power levels. One possible approach to improve low load performance would be to add a current offset, or voltage offset for convenience, to a sensed input current (or voltage) such that there is a minimum level of current (voltage) that is then multiplied up in order to achieve the desired peak Doff. A potential disadvantage of this approach is that it may distort the input "reference" signal to be not completely sinusoidal, with a pedestal, such that there might be some zero-crossing distortion impacting PF and HD.

There remains a need for improved techniques for operating at least certain types of PFC architectures and circuits under light-load operation, to enhance the dynamic range over which such architectures and circuits can operate continuously while maintaining a good Power Factor, low Harmonic Distortion, and good control of Vout.

According to one example of the teachings of the present invention, an offset voltage is added to a sensed sinusoidal input current, which is sensed as a voltage across a sensing resistor. The offset voltage is proportional to a compensated error voltage that is used in a PFC controller and provides an indication (inversely proportional) of the power level. The offset is thus larger when it is most needed, under light load, and smaller when it is least needed, under heavy load. This minimizes or at least reduces the distortion impact of adding the offset voltage. Such an offset voltage extends the dynamic range of the PFC such that it can maintain output regulation without pulse skipping or hysteretic behaviour, even under very light loads.

Thus, in one example, the offset varies inversely with power. In the example power converter shown in FIG. 1, Vcom provides an indication of the power level but varies inversely with the power level, and thus an attenuated value of Vcom could be used as an offset signal. The voltage Vcom is the output voltage of a voltage loop compensation transconductance amplifier in the example PFC control unit 14 (FIG. 1) described above, and varies inversely with power and directly with $Vin^2$. The voltage Vcom therefore serves as a convenient voltage to use in generating an offset signal, since it is larger under light load (low output current) and high input voltage, and smaller under heavy load (high output current) and low input voltage.

For instance, Vcom could be attenuated by a factor of approximately 50 to give approximately 50 mV of offset under light load conditions. It has been found that this level of offset is sufficient to ensure that Doff reaches a high enough peak value to avoid pulse skipping or hysteretic behaviour. A further refinement is to have a "level shift" or minimum level of Vcom at which no offset is added at all. In an example implementation described above, Vcom ranges from approximately 0.5V to 2.5V. An offset circuit or unit might then provide 0 mV offset for Vcom=0.5V, and 50 mV offset for Vcom=2.5V, and vary with Vcom between those minimum and maximum values.

The teachings of the present invention are not necessarily limited to using Vcom or any other particular signal in generating an offset signal. For example, other implementations of a PFC converter might use a voltage error signal that varies directly with power instead of inversely. The techniques according to the teachings of the present invention could be equally applied to such a voltage error signal, by inverting polarity of the voltage error signal (i.e., −Vcom) or applying some other function (e.g., 1/Vcom) to the voltage error signal to generate a signal that varies inversely with power.

Variation of an offset signal inversely with power is also intended to be illustrative and non-limiting. An offset signal might also or instead vary directly with input voltage and/or vary inversely with load current, for instance. The signals available in a PFC converter or its controller may be different than in the example disclosed in detail herein, and therefore substantially similar techniques according to the teaching of the present invention may be adapted by those skilled in the art to other particular PFC converter and controller implementations.

In the example power supply arrangement of FIG. 1, Vcom might be useful in generating an offset signal. Other signals may be available, or generated through voltage or current sensing, for example, in similar or different architectures. Variations in input voltage, output power, and output current may all affect operation of a PFC controller, and thus any one or more of these parameters could potentially be sensed and used to generate an offset signal.

There are also many forms or characteristics of variation of an offset signal. For example, an offset unit could be bi-stable, providing a fixed non-zero offset for a certain range of load and/or input voltage and no offset outside that range. The offset signal is thus effectively turned off or disabled when load is above a specific minimum threshold load and/or input voltage is below a maximum threshold voltage. In a multi-stable arrangement, multiple fixed offsets are provided depending on load and/or voltage. An offset signal could also or instead vary with load and/or voltage more continuously, according to a non-linear or linear function. An example described in detail below combines bi-stable operation, in the form of a level shift that causes no offset to be provided below a minimum Vcom voltage, with a continuously variable offset signal that is used above the minimum Vcom voltage.

References made herein to varying directly or inversely are intended to encompass all such forms of variation. Direct variation refers to variation of parameters in the same sense, polarity, or direction, i.e., parameters that increase or decrease together. Inverse variation refers to variation in an opposite sense, polarity, or direction, where one parameter increases when another decreases, and vice versa. Thus, Vcom in the example power supply arrangement of FIG. 1 varies inversely with output power and varies directly with input voltage. Although direct and inverse variation may include directly and inversely proportional relationships, the teachings of the present invention encompass other types of variation as well.

It has been found that an offset circuit according to the teachings of the present invention had the effect of allowing a PFC converter to operate down to at least 1% of rated load, whereas without the offset circuit the PFC converter would go into hysteretic (non-continuous) operation and cause an overvoltage at approximately 20% of maximum load. The impact of the offset circuit was to add approximately 0.5% to 4% distortion at the higher rated load (high power). This distortion impact would be larger if the offset were larger at the higher load instead of varying inversely with load.

Figure 10:
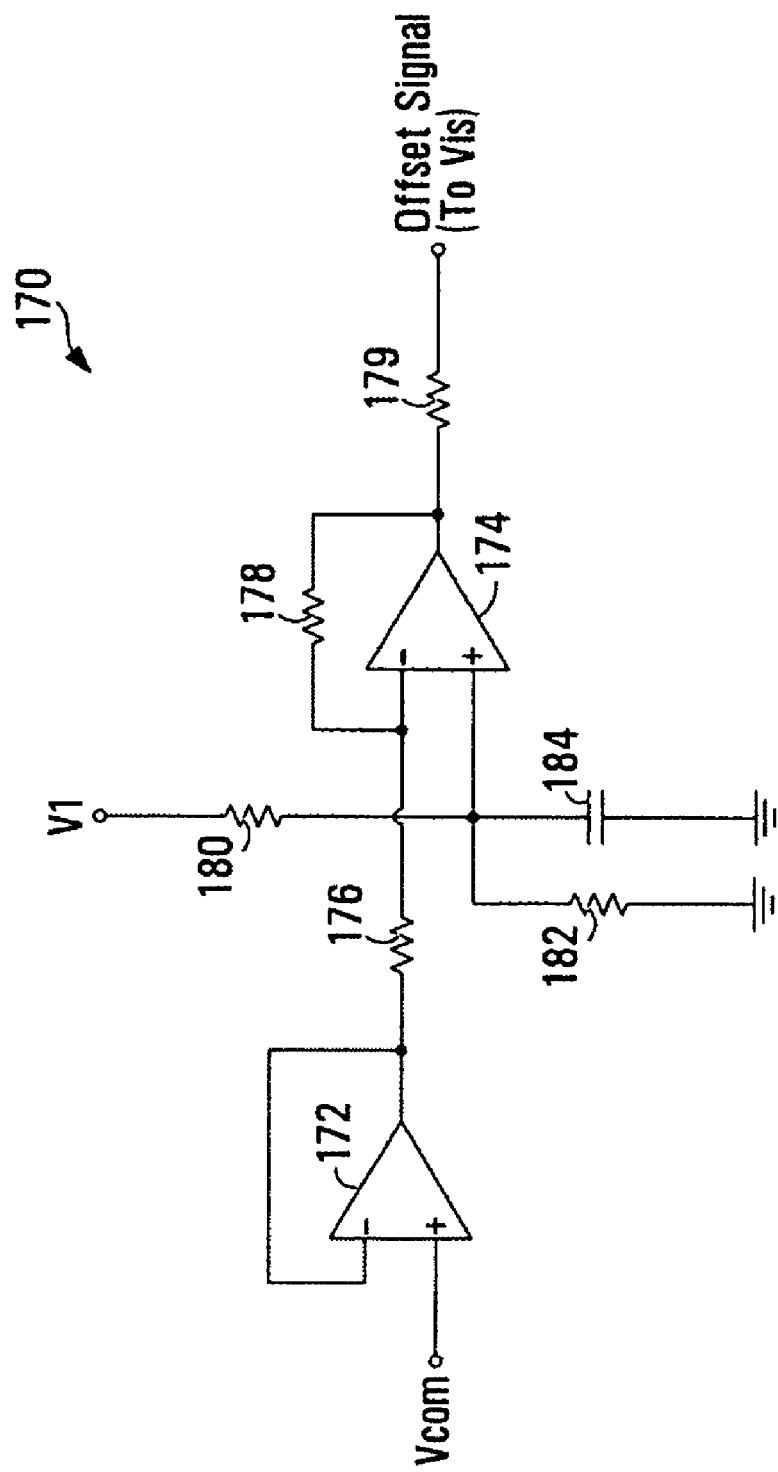
FIG. 10 is a schematic diagram of an example offset unit according to the teachings of the present invention.

Using an offset voltage that is dependent on Vcom, or more generally an offset that varies inversely with output power and/or directly with input voltage, adds an additional inner loop into a feedback loop of the PFC converter in one implementation. FIG. 10 is a schematic diagram of an offset unit, according to the teachings of the present invention, which uses such an offset voltage.

The example offset unit 170 is implemented as an amplifier circuit that includes a first amplifier 172, a second amplifier 174, resistors 176, 178, 179, 180, 182, and a capacitor 184. As noted above, the voltage error signal Vcom varies inversely with the output power level of the PFC converter 10 (FIG. 1). The example offset unit 170 receives Vcom and generates an offset signal responsive to Vcom as described below.

The first amplifier 172, implemented as an opamp in the example shown, has its output coupled to its inverting input and its non-inverting input coupled to receive Vcom. The Vcom signal is thus buffered by the first amplifier 172 to enable the offset unit 170 to be driven by Vcom.

The second amplifier 174 has its inverting input coupled to receive the buffered voltage error signal from the first amplifier 172 through the resistor 176. The inverting input of the second amplifier 174 is also coupled to its output through the resistor 178. A junction point between the resistor 180, which is coupled to a voltage node VI, and a parallel combination of the resistor 182 and the capacitor 184, is coupled to the non-inverting input of the second amplifier 174, and provides an offset voltage to the non-inverting input. The output of the second amplifier 174 is coupled to the Vis node of the PFC and LLC control unit 14 (FIG. 1) through the resistor 179 in the example shown, and thus the current sense signal Vis is offset by the offset signal.

The signal at the non-inverting input of the second amplifier 174 effectively level shifts the buffered voltage error signal from the first amplifier 172, to control the level of Vcom at which the Vis offset signal becomes effective. The resistors 176, 178, and 179 provide attenuation of the buffered voltage error signal from the first amplifier 172 to thereby generate the offset signal. Thus, the second amplifier 174 level shifts, attenuates and inverts the buffered voltage error signal.

According to one example implementation, VI=11V, and the component values in the offset unit 170 are as follows: R176 40.2 kΩ; R178=10 kΩ; R179=900Ω; R180=100 kΩ; R182=1 kΩ; and C184=1 µF. In combination with a 100Ω current sensing resistor also connected to the Vis node, the offset unit 170 implemented with these particular example component values and V1 voltage provides an offset to the Vis node of 0 mV at Vcom=0.7V, and −49 mV at Vcom=2.5V. In this particular example, an offset signal is applied to Vis when Vcom is above the level shift of 0.7V.

Figure 11:
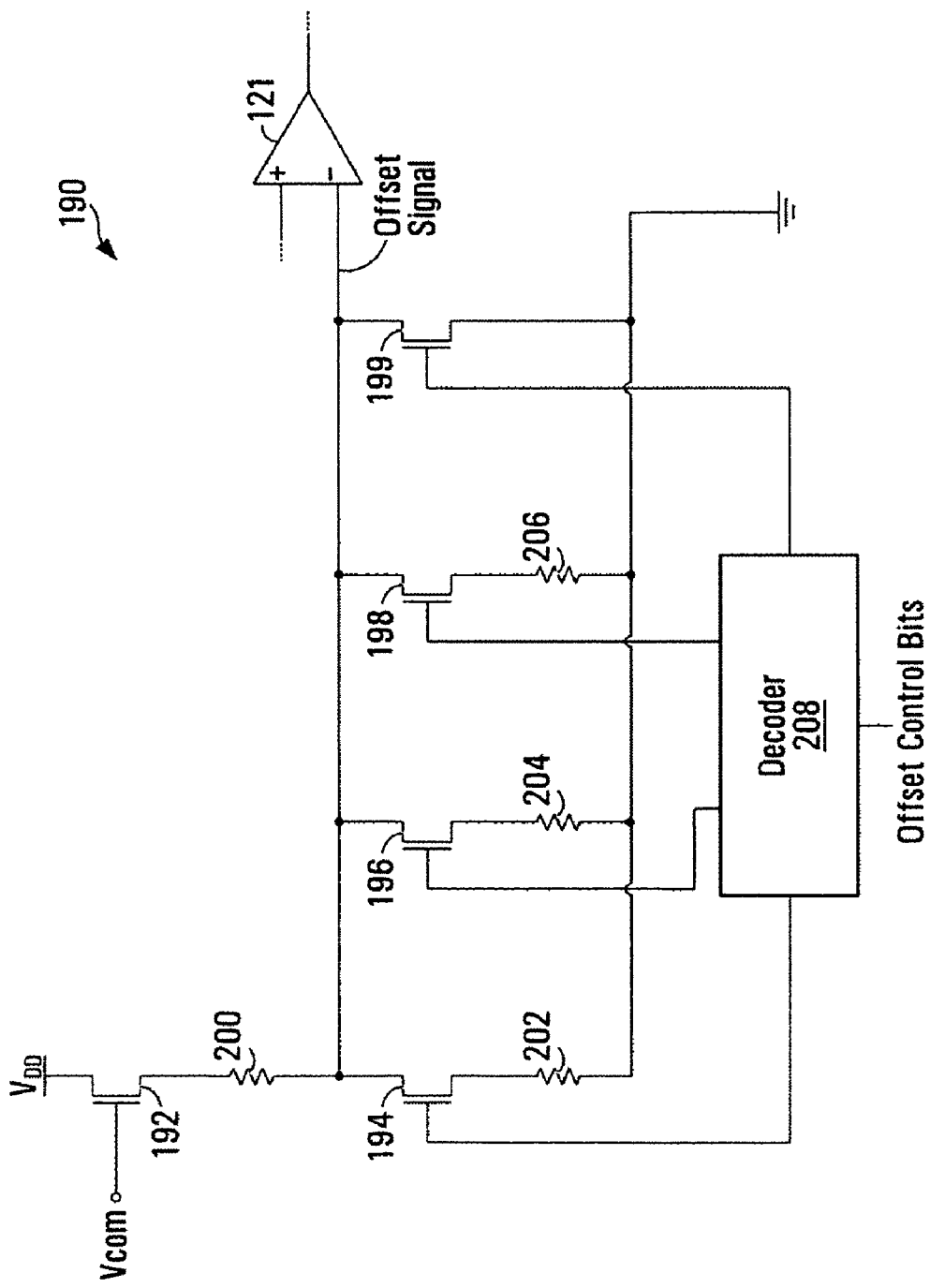
FIG. 11 is a schematic diagram of another example offset unit according to the teachings of the present invention.

The offset unit 170 provides a negative voltage offset for certain levels of load and input voltage, since Vcom varies inversely with load and directly with input voltage. Where a PFC control unit is implemented in an integrated circuit, for example, the offset 170 unit might be implemented as an external circuit. An offset signal could instead be generated and applied internally within an integrated circuit. FIG. 11 is a schematic diagram of another example offset unit according to the teachings of the present invention.

The example offset unit 190 includes NMOS transistors 192, 194, 196, 198, 199, resistors 200, 202, 204, 206, and a decoder 208. The gate terminal of the transistor 192 is coupled to Vcom to form an NMOS follower. The gate terminals of the transistors 194, 196, 198, and 199 are coupled to the decoder 208, which in turn receives offset control bits, at least two bits to control the four transistors 194, 196, 198, and 199 in this example, and controls the transistors accordingly. VDD is 3.3V in one example.

As shown, the offset signal generated by the example offset unit 190 is injected into the inverting input of the amplifier 121 (FIGS. 4 to 6), shifting and effectively boosting the Vis signal. As noted above, Vis is a current sense signal, and the amplifier 121 provides as an output a current representing the input current of the PFC converter. The example offset unit 190 thus provides the offset signal as a further input to the amplifier 121.

More offset is created when Vcom is high, which is at light load in the example power supply arrangement in FIG. 1. When Vcom is low, at high power in this example, the offset unit 190 injects little or no offset into the input of the amplifier 121. The offset unit 190 thus improves the load range of the PFC converter, at the expense of increasing distortion slightly at medium to high loads, preventing it from going into an overvoltage condition at light loads. Injecting 50 mV of offset at light load (Vcom=2.5V), for example, enables the PFC converter to operate continuously for a 1% load over the full range of AC input in some embodiments.

The example offset unit 190 uses an NMOS follower, implemented using the transistor 192, that buffers the Vcom signal. The NMOS follower also provides a level shift, in this case a subtraction of the effective threshold or turn-on voltage of device 192. The voltage at the source terminal of the transistor 192 is a level shifted version of Vcom, so that Vcom must be positive enough for the offset unit 190 to start providing any offset. An NMOS follower architecture might be desirable, for example, to prevent the offset unit 190 from interfering with the Vcom compensation network and from having any measurable effect on the transconductance amplifier used in generating Vcom. However, other implementations for providing a level shift, such as using an opamp or circuits that use one a PMOS transistor for the level shift, for example, are also possible.

A resistive divider circuit is used in the example offset unit 190 to create a desired offset.

One-Time Programmable (OTP) settings can be established using on-chip fuses, for example, to provide the offset control bits to the decoder 208 for selecting a particular resistive divider and thus the maximum level of offset for a particular implementation. Such settings need not necessarily be one-time settings, and could instead be user-configurable or even dynamically configurable, for instance. In some embodiments, multiple divider could be simultaneously selected, to provide even more possible maximum offset levels.

As will be apparent from FIG. 11, the offset unit 190 receives and effectively level shifts and divides the voltage error signal Vcom to generate the offset signal. The divider circuit actually includes multiple switched dividers formed by the resistor 200 in combination with the paths that are switched using the transistors 194, 196, 198, and 199. The resistors 202, 204, 206 and the path switched using the transistor 199 provide respective division ratios with the resistor 200. The division ratios are associated with respective maximum levels of the offset signal. The decoder 208 selects, in response to the offset control bits, one or more of the dividers to generate the offset signal.

In one embodiment, the offset unit 190 allows selection of a maximum offset signal level of 0 mV, 20 mV, 40 mV or 60 mV at Vcom=2.5V. The resistor 200 may have a resistance of R200=150 kΩ to keep the power consumption of the offset unit 190 low. In this case, the other resistors might have the following values, to respectively enable maximum offset signal values of 60 mV, 40 mV, and 20 mV: R202=3.7 kΩ; R204=2.4 kΩ; R206=1.2 kΩ. The path switched using the transistor 199 has a division ratio associated with a zero maximum level of the offset signal, to thereby disable the offset signal. Thus, in this example, Vis can be level shifted by a small voltage proportional to Vcom to ensure a large enough current signal is available in light load conditions, with the maximum value of the level shift being adjustable between 0 (disabled), about 1/50th, about 1/33rd, or about 1/100th of (Vcom−0.5V). The 0.5V term in this expression represents a level shift, which in the example offset unit 190 is the approximate turn-on voltage of the transistor 192.

With reference again to FIG. 4, the ratio of the resistance of the filter resistor 126 and the input resistor 120 sets the gain for Vis. In one embodiment, R126=5 MΩ, R126=200 kΩ, and the W/L ratios of the transistors 122 and 123 are equal (i.e., unity current mirror factor), and the gain for Vis is −25. Further gain can be created in the circuit by changing the current mirror ratio into the low pass filter. The overall gain of the circuit is nominally −30 but can be changed to −60, for example, by adding a further transistor connected in parallel with the transistor 123.

The chopper circuit and low pass filter attenuate the amplified sense voltage Vis (amplified by the components 120, 121, 122, 123, and 126) in response to the feedback voltage Vcom. The higher the feedback voltage, Vcom, the less attenuation there will be on Pmul. The low pass filter corner frequency is low enough to create an average current, and to smooth out the effect of the chopper. Pmul is related to the off-time, Doff, of the PFC, and as noted above controls the duty cycle of the PWM switching signal Ppwm. A higher Pmul implies a larger Doff time, which is a narrower PWM pulse.

The sense voltage Vis is also replicated through a different amplification (−4.4 in some embodiments) and compared to the threshold (Voc) to determine when the current has gone too high, signalling an overcurrent fault (OCf). This overcurrent fault is combined with an overvoltage fault by the OR gate 114 (FIG. 3) to create the Pflt signal. The comparator 129 may have hysteresis to improve noise immunity (noise generated by the chopper more so than external noise). The hysteresis is achieved in one embodiment by providing the resistor 130 as a multi-tap resistor and choosing two different taps, illustratively R130=200 kΩ for a gain of −4.4 and R130=220 kΩ for a gain of −4.84. The different amplification is accomplished by changing the current mirror ratio rather than scaling the resistor 130 in some embodiments.

The output voltage Pmul of the current sense/multiplier can be predicted as follows:

$$Pmul=Km*Ki*[(R17*Is)-Vioff]*(Vcom-Voff),$$

where:
Km=chopper multiplier gain (0.5 in one embodiment);
Ki=current path gain (selectable as −30 or −60 in one embodiment);
R17=resistance of the current sense resistor 17 (FIG. 1);
Is=current through the current sense resistor 17;
R17*Is=Vis, where Vis is negative;
Vioff=offset voltage subtracted from Vis (=[Vcom−0.5]/50, for Vcom>0.5 in one embodiment); and
Voff=offset voltage of the Vcom chopper PWM circuit (0.5 in one embodiment).

Figure 12:
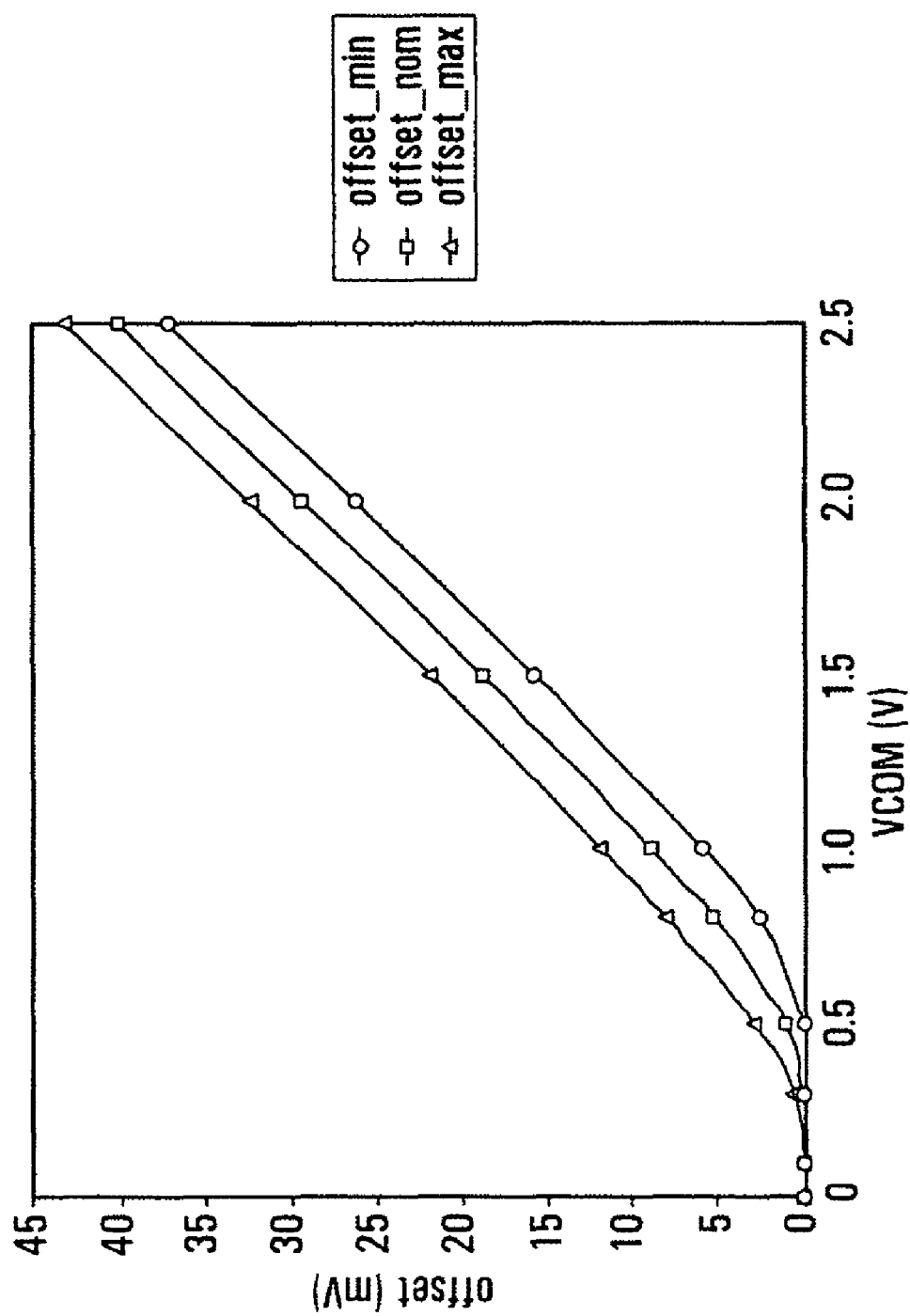
FIG. 12 is a plot representing an illustrative example transfer function of an offset unit according to the teachings of the present invention.

FIG. 12 is a plot representing an illustrative transfer function of an example offset unit 190 (FIG. 11), with the offset control bits selecting the R200/R204 divider to provide a maximum offset level of 40 mV. Minimum, nominal, and maximum plots are shown in FIG. 12. The transfer function of FIG. 12 was generated through simulation of one particular embodiment. Thus, different transfer functions may be provided in other embodiments, and actual transfer functions observed for similar or different embodiments may vary from the illustrative example of FIG. 12.

Figure 13:
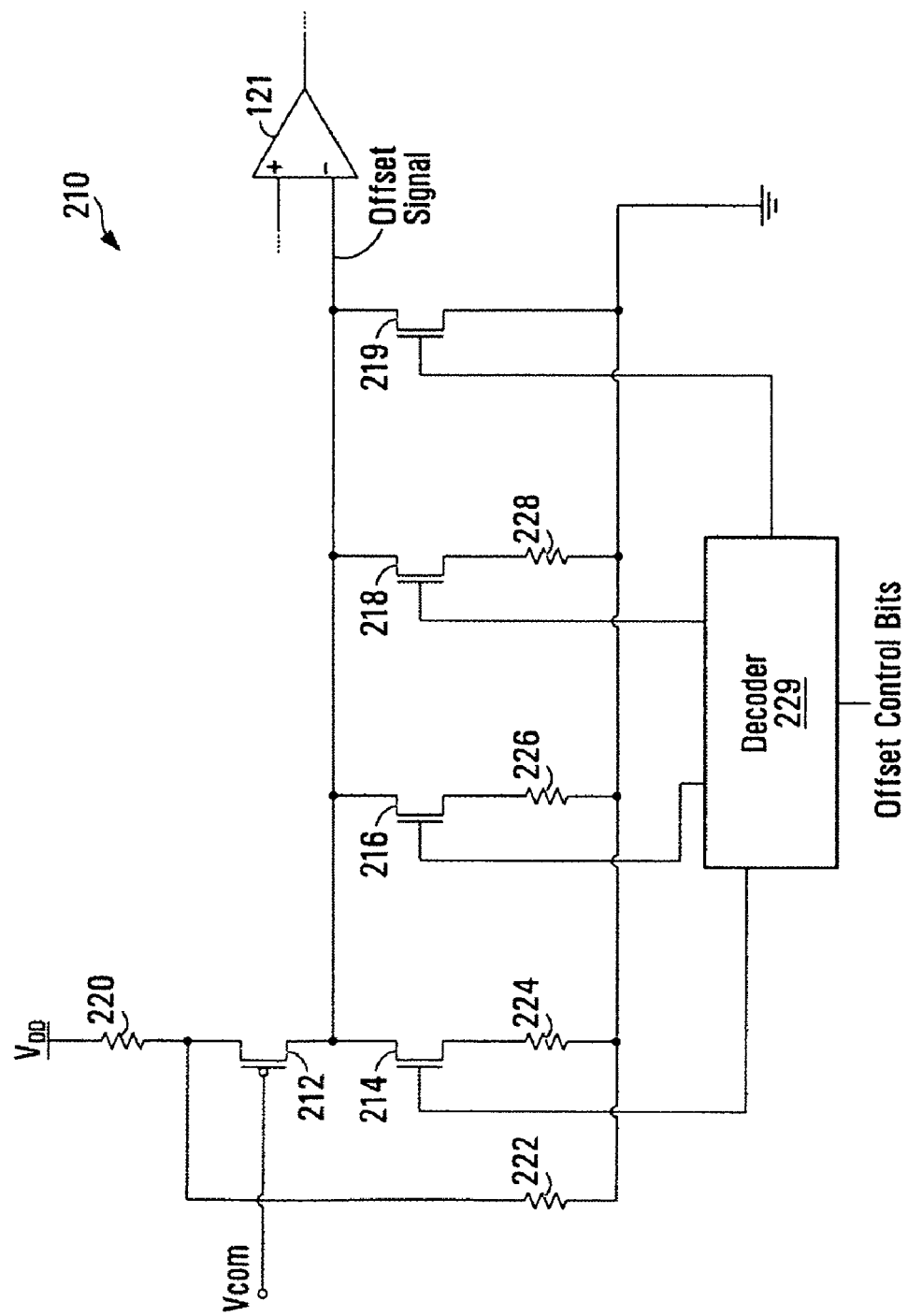
FIG. 13 is a schematic diagram illustrating a further example offset unit according to the teachings of the present invention.

FIG. 13 is a schematic diagram illustrating a further example offset unit according to the teachings of the present invention. The example offset unit 210 is substantially identical to the example offset unit 190 (FIG. 11) and operates in substantially the same way. However, the offset unit 210 provides an offset signal that varies inversely with output power using a Vcom signal that varies directly with output power, as may be the case in other power supply arrangements. For example, a Vcom signal that varies directly with output power could be generated if an inverse sense of feedback is used on the amplifier 113 in FIG. 3.

The example offset unit 210 includes transistors 212, 214, 216, 218, 219, and resistors 220, 222, 224, 226, and 228. The offset signal is output to the amplifier 121. The resistors 220 and 222 form a resistive divider which in one embodiment is set to 2.5V plus the gate to source terminal threshold voltage of the PMOS transistor 212. Vcom is effectively inversely followed and level shifted. The transistors 214, 216, 218, and 219 are used in conjunction with the decoder 229 as described above to select a particular division ratio associated with a desired maximum level of the offset signal, including a zero level for disabling the offset signal.

Figure 14:
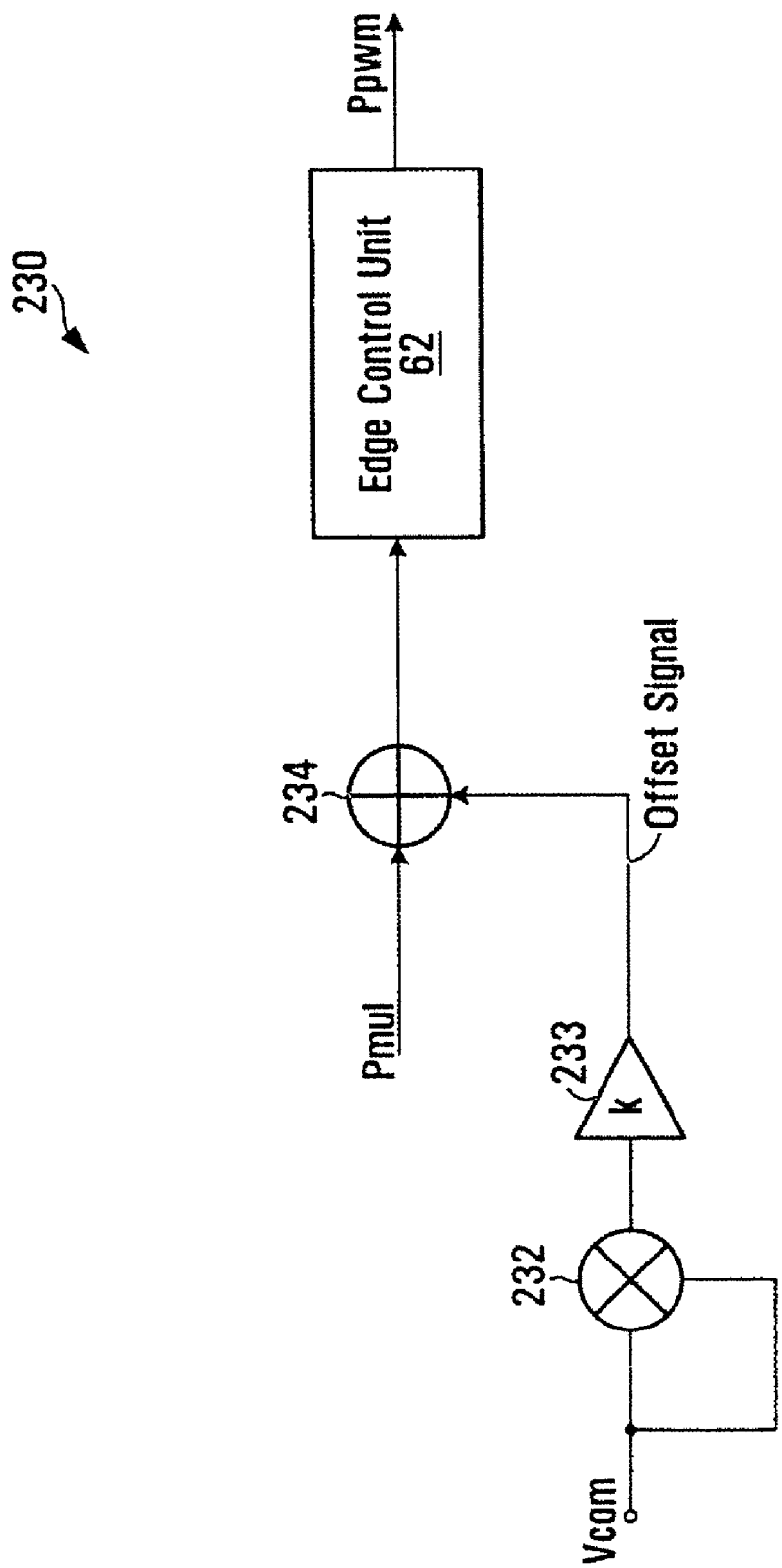
FIG. 14 is a schematic diagram illustrating yet another example offset unit according to the teachings of the present invention.

FIG. 14 is a schematic diagram illustrating yet another example offset unit according to the teachings of the present invention. The example offset unit 230 includes a multiplier 232 and a gain stage 233, which generate the offset signal as $k*Vcom^2$, where k is a multiplicative constant term, to attenuate $Vcom^2$ in one example. A summing node 234 is used to offset the control signal Pmul by the offset signal. As noted above, Pmul controls the duty cycle of the PWM switching signal Ppwm, which is generated by the edge control unit 62. From an expansion of the above expression for Pmul, it will become apparent that adding a $Vcom^2$ term to Pmul has a substantially similar effect as injecting an offset into the amplifier 121 (FIG. 11). Although the example of $k*Vcom^2$ is shown in FIG. 14, an offset signal for offsetting Pmul may have different forms. $Vcom^2$ could be used directly, without a multiplicative constant, and/or the offset signal could include other terms, for instance.

Figure 15:
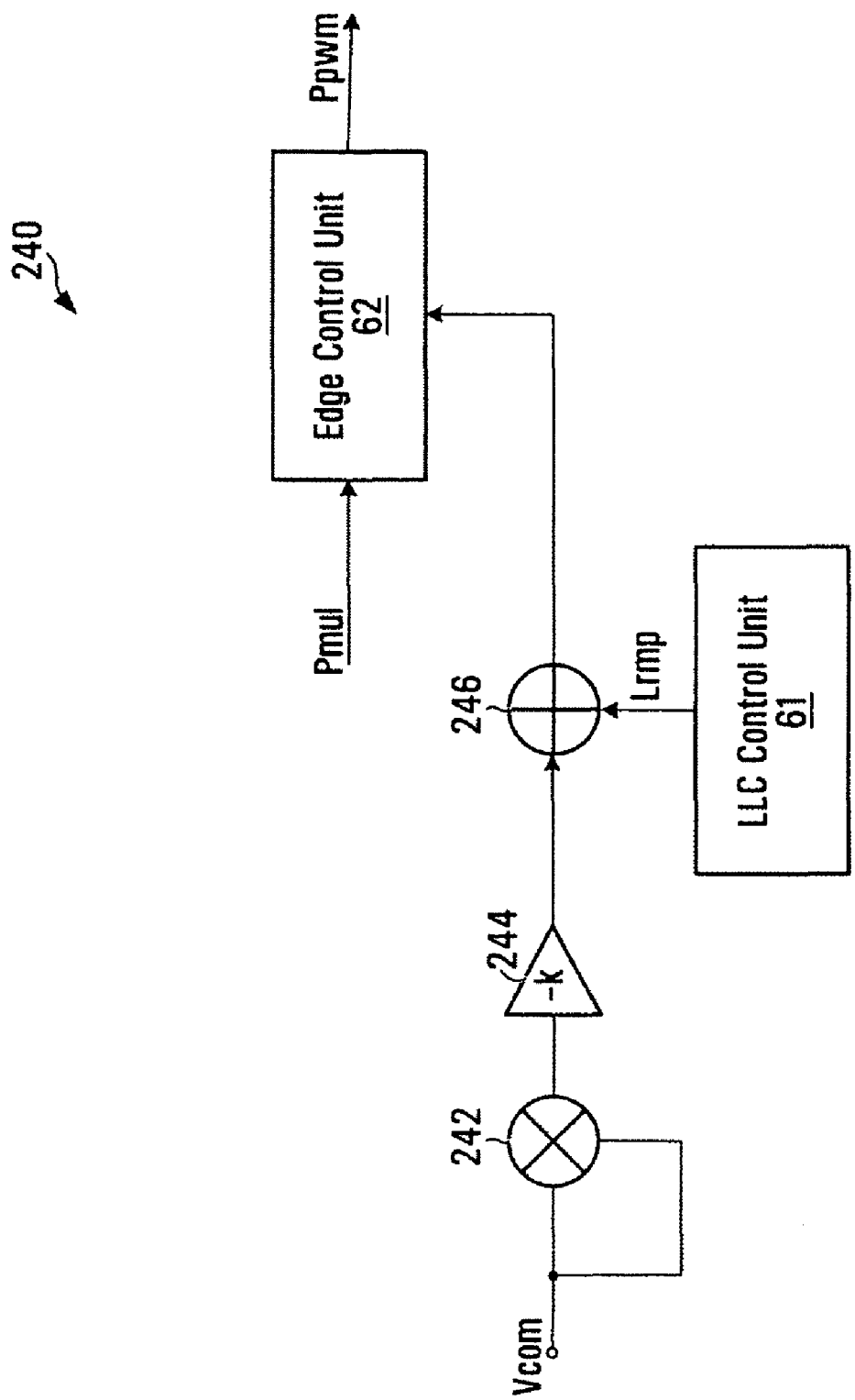
FIG. 15 is a schematic diagram illustrating a still further example offset unit according to the teachings of the present invention.

FIG. 15 is a schematic diagram illustrating a still further example offset unit according to the teachings of the present invention. In the example offset unit 240, the offset signal $-k*Vcom^2$ is generated by a multiplier 242 and a gain stage 244. Gain and inversion are shown in a single gain stage 244 in the example offset unit 240, but could instead be provided in separate stages. The offset signal in this example is applied to the ramp signal Lrmp, which is compared with the control signal Pmul in the edge control unit 62, illustratively in a comparator in the edge control unit. Applying an offset signal of $-Vcom^2$, or $-k*Vcom^2$ where k is a constant, to a ramp signal with which Pmul is compared is equivalent to adding $Vcom^2$ or $k*Vcom^2$ to Pmul.

FIGS. 10, 11, and 13 to 15 clearly illustrate that an offset signal may be applied to any of various signals, including a duty cycle control signal such as Pmul or signals that are used in generating Pmul. The example offset unit 170 (FIG. 10) offsets the current sense signal Vis, the example offset units 190 and 210 (FIGS. 11 and 13) effectively offset a current representing the output current of the PFC converter, the example offset unit 230 (FIG. 14) offsets Pmul, and the example offset unit 240 (FIG. 15) offsets a ramp signal with which Pmul is compared.

These techniques are substantially equivalent for the example power supply arrangement shown in FIG. 1. Other substantially equivalent techniques may also be apparent to those skilled in the art. For instance, an offset signal generated by the offset unit 190 or 210 (FIGS. 11 and 13) could be inverted and applied to the non-inverting input of the amplifier 121, through another series resistor that is coupled to the resistor 120 at the non-inverting input, instead of to the inverting input. Another possible option would be to generate an offset current signal and to use that offset current signal to offset an input current at the non-inverting input of the amplifier 121 instead of the input voltage as shown, for example, in FIGS. 11 and 13. Thus, when the teachings of the present invention are used in conjunction with a PFC converter control unit including the example circuit shown in FIG. 4, an offset signal might be applied as a voltage or a current, directly or through one or more resistors, to the inverting or non-inverting input of the amplifier 121. More generally, an offset signal may be a voltage signal or a current signal.

Figure 16:
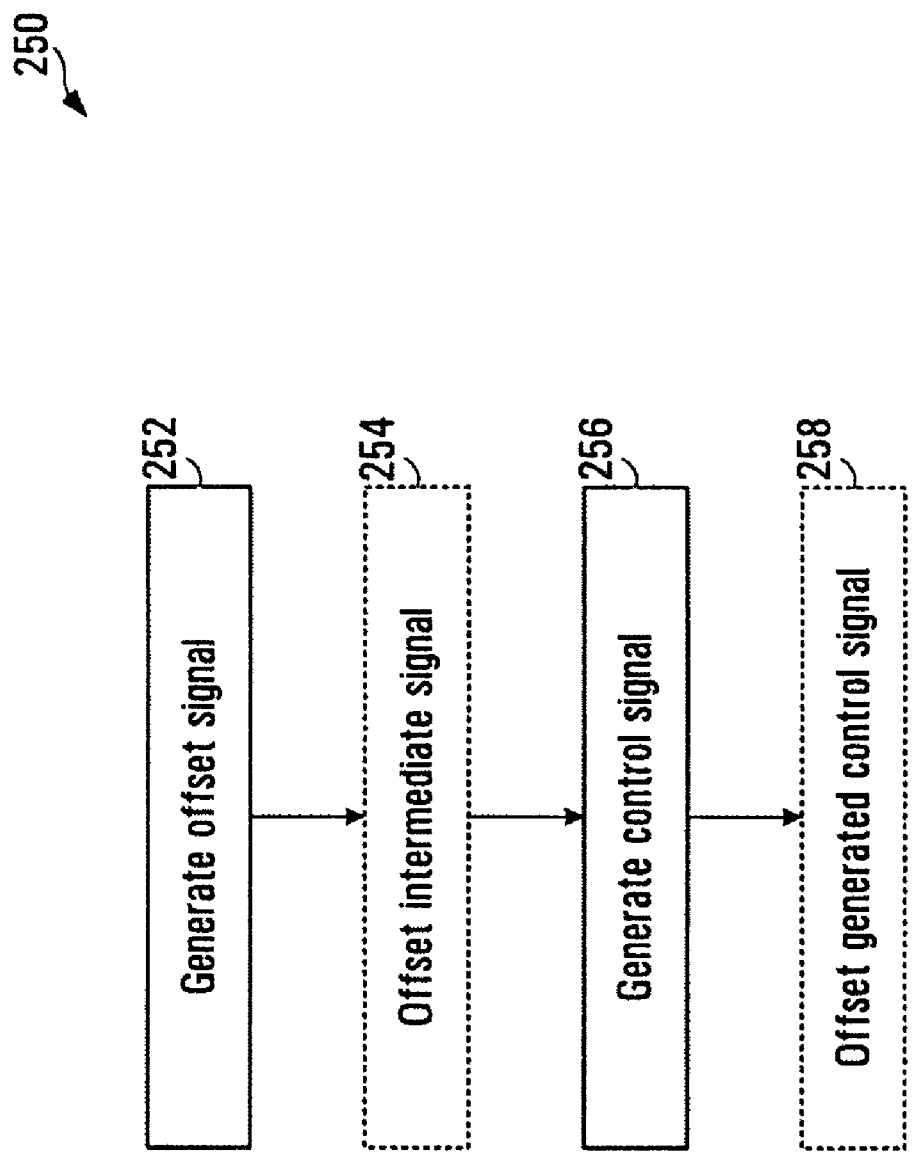
FIG. 16 is an example flow diagram of a method according to the teachings of the present invention.

Although described above primarily in the context of circuits or apparatus, examples of the present invention may also be implemented in the form of methods. FIG. 16 is an example flow diagram of a method according to the teachings of the present invention.

The method 250 involves generating a variable offset signal at 252. A control signal for controlling a duty cycle of a PWM switching signal that controls a switch in a PFC converter is generated at 256. As illustrated in dashed lines at 254 and 256, the method 250 may also include using the offset signal to offset the generated control signal or an intermediate signal that is used in generating the control signal at 258.

The operations of the method 250 may be repeated during operation of a converter, so that appropriate offsets, possibly including zero offset, are applied as load levels vary and/or input voltage varies.

Variations of the illustrative example method 250 and various ways of performing the operations shown in FIG. 16 will be apparent from the foregoing description of FIGS. 1 to 15. For example, where the voltage error signal Vcom or some other signal that varies inversely with the output power level of the PFC converter is available, the generating operation at 252 may involve receiving the voltage error signal and generating the offset signal responsive to the voltage error signal.

Further variations of the method 250 may also be or become apparent to those skilled in the art.

What has been described is merely illustrative of the application of principles of embodiments of the invention. Other arrangements and methods can be implemented by those skilled in the art without departing from the scope of the present invention.

For example, the drawings are intended solely for illustrative purposes. The present invention is in no way limited to the particular examples explicitly shown in the drawings and described herein. Other examples may include additional, fewer, and/or different components interconnected in a similar or different manner than shown. In the case of a method, examples of the invention may similarly involve performing additional, fewer, and/or different operations in a similar or different order than shown in FIG. 16.

In general, the teachings of the present invention encompass an apparatus including a control unit for a PFC converter and an offset unit. One example of the control unit generates a control signal (i.e., Pmul in FIG. 4) for controlling a duty cycle of a PWM switching signal (i.e, Ppwm) that controls a switch in the PFC converter. The offset unit is coupled to the control unit, to generate a variable offset signal to offset the control signal or a signal used by the control unit to generate the control signal.

The offset unit may in some embodiments be provided separately from the control unit. Thus, the teachings of the present invention also encompass an apparatus that includes an output for providing a variable offset signal to a control unit for a PFC converter, and an offset unit coupled to the output. The control unit to which the output provides the offset signal generates a control signal for controlling a duty cycle of a PWM switching signal that controls a switch in the PFC converter. The offset unit generates and provides to the output the variable offset signal to offset the control signal or a signal used by the control unit to generate the control signal.

The present invention is also not strictly limited to the particular offset signal generation circuits or techniques shown in the drawings and described in detail above. For example, other implementations might take into account the fact that the compensated error voltage Vcom may have a relatively large dynamic range depending on input voltage and/or whether or not the PFC converter is operating under light load. In one PFC converter, for a given power level, the range of Vcom is proportional to the square of input voltage, $Vin^2$. This means that for an input voltage that ranges from 85 Vrms to 265 Vrms, Vcom has a range of $(265/85)^2$ or 9.7:1. If the maximum value of Vcom is set to 3V as a result of clipping in an opamp for instance, then the minimum value will be 300 mV in this example, which can be an overly large range to expect from an opamp. The situation may become worse under light load. In this case, Vcom might be even higher and be clipped, resulting in output regulation being essentially set by OV hysteresis limits or lost entirely.

The techniques described above address these issues by using an offset signal that is responsive to Vcom. Another option would be to multiply Vis by the square of Vcom in generating Pmul. This results in a smaller dynamic range on Vcom, specifically the square root of the range noted above.

The compensated error voltage Vcom is also intended as a non-limiting example of a signal from which an offset signal could be generated. Input voltage, output power, and/or output current, for example, could be separately sensed and used to generate the offset signal. Considering the example of input voltages, variations in input voltage can be particularly problematic where power grid voltages are not well regulated and can thus fluctuate.

We claim:

1. An apparatus comprising:
    a control unit to generate a control signal to control a duty cycle of a PWM (Pulse Width Modulation) switching signal that controls a switch in a PFC (Power Factor Correction) converter; and
    an offset unit coupled to the control unit to generate a variable offset signal to offset the control signal or a signal used by the control unit to generate the control signal, wherein the offset unit includes an amplifier circuit to receive a voltage error signal that is responsive to an output voltage of the PFC converter, wherein the amplifier is coupled to generate the offset signal, the amplifier circuit including a first amplifier to receive and buffer the voltage error signal, to thereby generate a buffered voltage error signal, and a second amplifier to level shift, attenuate and invert the buffered voltage error signal, to thereby generate the variable offset signal for offsetting a current sense signal.

2. The apparatus of claim 1, wherein the variable offset signal is responsive to at least one of an input voltage of the PFC converter and an output power level of the PFC converter.

3. The apparatus of claim 2, wherein the variable offset signal varies directly with the input voltage of the PFC converter.

4. The apparatus of claim 2, wherein the variable offset signal varies inversely with the output power level of the PFC converter.

5. The apparatus of claim 2, wherein the variable offset signal varies both directly with the input voltage of the PFC converter and inversely with the output power level of the PFC converter.

6. The apparatus of claim 1, wherein the control unit comprises:
a PWM converter to produce a PWM signal responsive to an output voltage error signal that is responsive to an output voltage of the PFC converter;
a switching circuit to switch in response to the PWM signal a current representing an input current of the PFC converter; and
a circuit to generate the control signal for the PFC converter responsive to the switched current,
wherein the offset unit is coupled to receive the voltage error signal and to generate the variable offset signal in response to the voltage error signal.

7. The apparatus of claim 6, wherein the voltage error signal varies directly with an input voltage of the PFC converter and varies inversely with an output power level of the PFC converter, wherein the current representing the input current of the PFC converter is generated from a current sense signal.

8. The apparatus of claim 1, wherein the offset unit comprises:
a follower circuit to receive and level shift a voltage error signal that is responsive to an output voltage of the PFC converter, wherein the follower circuit is coupled to generate a level shifted signal; and
a divider circuit coupled to receive and divide the level shifted signal to generate the variable offset signal for offsetting a current sense signal.

9. The apparatus of claim 8, wherein the divider circuit includes:
a plurality of switched dividers having respective division ratios; and
a decoder coupled to select, responsive to offset control bits, one or more of the plurality of switched dividers to generate the variable offset signal.

10. The apparatus of claim 9, wherein the plurality of switched dividers comprises a switched divider having a division ratio associated with a zero maximum level of the variable offset signal, to thereby disable the variable offset signal.

11. The apparatus of claim 6, wherein the control unit further includes:
an amplifier to receive as an input a current sense signal and provide as an output the current representing the input current of the PFC converter,
wherein the offset unit is coupled to provide the variable offset signal as a further input to the amplifier.

12. The apparatus of claim 1, wherein the control unit comprises an integrated circuit, and wherein the offset unit is external to the integrated circuit.

13. The apparatus of claim 1, wherein the control unit and the offset unit comprise an integrated circuit.

14. The apparatus of claim 1, wherein the control unit comprises:
a PWM converter to produce a PWM signal responsive to an output voltage error signal that is responsive to an output voltage of the PFC converter;
a switching circuit to switch in response to the PWM signal a current representing an input current of the PFC converter; and
a circuit to generate the control signal for the PFC converter in response to the switched current, wherein the control unit further includes an amplifier to receive at an input a current sense signal and provide at an output the current representing the input current of the PFC converter, wherein the offset unit is coupled to provide the offset signal as an offset current for offsetting a current at the input of the amplifier.

15. The apparatus of claim 1, wherein the control unit comprises:
a PWM converter to produce a PWM signal responsive to an output voltage error signal that is responsive to an output voltage of the PFC converter,
a switching circuit to switch in response to the PWM signal a current representing an input current of the PFC converter; and
a circuit to generate the control signal for the PFC converter in response to the switched current, wherein the current representing the input current of the PFC converter is generated from a current sense signal, and wherein the current sense signal is offset by the variable offset signal.

16. The apparatus of claim 1, wherein the control signal is offset by the variable offset signal.

17. The apparatus of claim 1, further including a comparator coupled to receive and compare the control signal with a ramp signal and to output the PWM switching signal as a comparison result, wherein the ramp signal is offset by the variable offset signal.

18. A method of controlling a PFC (Power Factor Correction) converter, the method comprising:
generating a variable offset signal;
generating a control signal for controlling a duty cycle of a PWM (Pulse Width Modulation) switching signal that controls a switch in the PFC converter;
offsetting the generated control signal in response to the variable offset signal;
receiving and level shifting a voltage error signal that is responsive to an output voltage of the PFC converter to generate a level shifted signal; and
receiving and dividing the level shifted signal to generate the variable offset signal for offsetting a current sense signal.

19. The method of claim 18, wherein offsetting the generated control signal in response to the variable offset signal includes offsetting a signal used to generate the control signal.

20. The method of claim 18, wherein the variable offset signal varies directly with an input voltage of the PFC converter.

21. The method of claim 18, wherein the variable offset signal varies inversely with an output power level of the PFC converter.

22. The method of claim 18, wherein the variable offset signal varies both directly with an input voltage of the PFC converter and inversely with the output power level of the PFC converter.

23. The method of claim 18, further comprising:
generating a PWM signal in response to the voltage error signal responsive to the output voltage of the PFC converter; and
switching in response to the PWM signal a current representing an input current of the PFC converter offset by the variable offset signal,
wherein generating the PWM switching signal that controls the switch of the PFC converter includes generating the PWM switching signal in response to the switched current, and wherein generating the variable offset signal includes receiving the voltage error signal and generating the variable offset signal in response to the voltage error signal.

24. The method of claim 23, wherein the voltage error signal varies directly with an input voltage of the PFC converter and varies inversely with an output power level of the PFC converter, wherein the current representing the input current of the PFC converter is generated from the current sense signal, and wherein generating the variable offset signal includes:

buffering, level shifting, attenuating, and inverting the voltage error signal to generate the offset signal.

25. The method of claim 18, wherein dividing the level shifted signal comprises:

selecting one of a plurality of division ratios; and
dividing the level shifted signal in accordance with the selected one of the plurality of division ratios.

26. The method of claim 25, wherein the plurality of division ratios includes a division ratio associated with a zero maximum level of the variable offset signal.

27. The method of claim 23, wherein the current representing the input current of the PFC converter is generated by an amplifier that receives as an input the current sense signal, and wherein offsetting the generated control signal includes providing the offset signal as a further input to the amplifier.

28. The method of claim 18, further including:

generating a PWM signal in response to a voltage error signal responsive to an output voltage of the PFC converter; and switching in response to the PWM signal a current representing an input current of the PFC converter offset by the variable offset signal, wherein generating a PWM switching signal that controls the switch of the PFC converter includes generating the PWM switching signal in response to the switched current, wherein the current representing the input current of the PFC converter offset by the variable offset signal is generated by an amplifier, wherein generating a variable offset signal includes generating an offset current as the variable offset signal, and wherein offsetting the generated control signal includes offsetting a current at an input of the amplifier with the variable offset signal.

29. The method of claim 18, further including:
generating a PWM signal in response to a voltage error signal responsive to an output voltage of the PFC converter; and switching in response to the PWM signal a current representing an input current of the PFC converter offset by the variable offset signal, wherein generating a PWM switching signal that controls the switch of the PFC converter includes generating the PWM switching signal in response to the switched current, wherein the current representing the input current of the PFC converter offset by the variable offset signal is generated in response to a current sense signal, and wherein offsetting the generated control signal includes offsetting the current sense signal in response to the variable offset signal.

30. The method of claim 18, further including comparing the control signal with a ramp signal to generate the PWM switching signal, wherein offsetting the generated control signal includes offsetting the ramp signal in response to the variable offset signal.

31. An apparatus comprising:

an output coupled to provide a variable offset signal to a control unit for a PFC (Power Factor Correction) converter, the control unit to generate a control signal to control a duty cycle of a PWM (Pulse Width Modulation) switching signal to control a switch in the PFC converter; and an offset unit coupled to generate and provide to the output the variable offset signal to offset the control signal or a signal used by the control unit to generate the control signal, wherein the offset unit includes a follower circuit to receive and level shift a voltage error signal that is responsive to an output voltage of the PFC converter to generate a level shifted signal, and a divider circuit coupled to receive and divide the level shifted signal to generate the variable offset signal for offsetting a current sense signal.

* * * * *